US009612369B2

(12) United States Patent
Banerjee et al.

(10) Patent No.: US 9,612,369 B2
(45) Date of Patent: *Apr. 4, 2017

(54) RED OMNIDIRECTIONAL STRUCTURAL COLOR MADE FROM METAL AND DIELECTRIC LAYERS

(71) Applicants: Toyota Motor Engineering & Manufacturing North America, Inc., Erlanger, KY (US); Toyota Jidosha Kabushiki Kaisha, Toyota (JP)

(72) Inventors: Debasish Banerjee, Ann Arbor, MI (US); Minjuan Zhang, Ann Arbor, MI (US); Masahiko Ishii, Okazaki (JP)

(73) Assignees: Toyota Motor Engineering & Manufacturing North America, Inc., Erlanger, KY (US); Toyota Jidosha Kabushiki Kaisha, Tokyo-shi (JP)

( * ) Notice: Subject to any disclaimer, the term of this patent is extended or adjusted under 35 U.S.C. 154(b) by 148 days.

This patent is subject to a terminal disclaimer.

(21) Appl. No.: 14/471,834

(22) Filed: Aug. 28, 2014

(65) Prior Publication Data

US 2014/0368918 A1  Dec. 18, 2014

Related U.S. Application Data

(63) Continuation-in-part of application No. 14/460,511, filed on Aug. 15, 2014, which is a
(Continued)

(51) Int. Cl.
*G02B 5/08* (2006.01)
*C09C 1/00* (2006.01)

(52) U.S. Cl.
CPC ......... *G02B 5/0825* (2013.01); *G02B 5/0858* (2013.01); *C09C 1/0015* (2013.01)

(58) Field of Classification Search
CPC ...... G02B 5/08; G02B 5/0808; G02B 5/0816; G02B 5/0833; G02B 5/085; G02B 5/0858;
(Continued)

(56) References Cited

U.S. PATENT DOCUMENTS 3,247,392 A   4/1966  Thelen
3,650,790 A   3/1972  Klenke et al.
(Continued)

FOREIGN PATENT DOCUMENTS

CN   1527100 A   9/2004
CN   1741246 A   3/2006
(Continued)

OTHER PUBLICATIONS

Sajeev John et al., "Photonic Band Gap Materials: A Semiconductor for Light", Department of Physics, University of Toronto, p. 1-23; 2001.
(Continued)

*Primary Examiner* — Kimberly N Kakalec
(74) *Attorney, Agent, or Firm* — Dinsmore & Shohl LLP

(57) ABSTRACT

A multilayer stack displaying a red omnidirectional structural color. The multilayer stack includes a core layer, a semiconductor layer extending across the core layer, and a dielectric layer extending across the semiconductor layer. The semiconductor layer absorbs more than 70% of incident white light that has a wavelength less than 550 nanometers (nm). In addition, the dielectric layer in combination with the core layer reflects more than 70% of the incident white light with a wavelength greater than 550 nm. In combination, the core layer, semiconductor layer and dielectric layer form an omnidirectional reflector that reflects a narrow band of electromagnetic radiation with a center wavelength between 550-700 nm, has a width of less than 200 nm wide
(Continued)

and a color shift of less than 100 nm when the reflector is viewed from angles between 0 and 45 degrees.

30 Claims, 16 Drawing Sheets

Related U.S. Application Data continuation-in-part of application No. 14/242,429, filed on Apr. 1, 2014, which is a continuation-in-part of application No. 14/138,499, filed on Dec. 23, 2013, which is a continuation-in-part of application No. 13/913,402, filed on Jun. 8, 2013, which is a continuation-in-part of application No. 13/760,699, filed on Feb. 6, 2013, which is a continuation-in-part of application No. 13/572,071, filed on Aug. 10, 2012, which is a continuation-in-part of application No. 13/021,730, filed on Feb. 5, 2011, now Pat. No. 9,063,291, which is a continuation-in-part of application No. 12/793,772, filed on Jun. 4, 2010, now Pat. No. 8,736,959, which is a continuation-in-part of application No. 12/388,395, filed on Feb. 18, 2009, now Pat. No. 8,749,881, which is a continuation-in-part of application No. 11/837,529, filed on Aug. 12, 2007, now Pat. No. 7,903,339, said application No. 13/021,730 is a continuation-in-part of application No. 11/837,529, said application No. 13/760,699 is a continuation-in-part of application No. 13/021,730, and a continuation-in-part of application No. 12/467,656, filed on May 18, 2009, now Pat. No. 8,446,666, said application No. 13/913,402 is a continuation-in-part of application No. 13/572,071, and a continuation-in-part of application No. 13/014,398, filed on Jan. 26, 2011, now Pat. No. 9,229,140, which is a continuation-in-part of application No. 12/793,772, and a continuation-in-part of application No. 12/686,861, filed on Jan. 13, 2010, now Pat. No. 8,593,728, which is a continuation-in-part of application No. 12/389,256, filed on Feb. 19, 2009, now Pat. No. 8,329,247, said application No. 13/913,402 is a continuation-in-part of application No. 12/893,152, filed on Sep. 29, 2010, now Pat. No. 8,313,798, which is a continuation-in-part of application No. 12/467,656.

(58) Field of Classification Search
CPC ........ G02B 5/0875; G02B 5/22; G02B 5/223; G02B 5/26; G02B 5/28; G02B 5/285; G02B 5/286; G02B 5/288
USPC ......... 359/577–590; 428/620, 621, 622, 623, 428/641
See application file for complete search history.

(56) References Cited

U.S. PATENT DOCUMENTS

| | | |
|---|---|---|
| 3,769,515 A | 10/1973 | Clark, Jr. |
| 3,885,408 A | 5/1975 | Clark, Jr. |
| 3,910,681 A | 10/1975 | Elliott et al. |
| 3,953,643 A | 4/1976 | Cheung et al. |
| 4,079,605 A | 3/1978 | Bartels |
| 4,449,126 A | 5/1984 | Pekker |
| 4,525,028 A | 6/1985 | Dorschner |
| 4,544,415 A | 10/1985 | Franz et al. |
| 4,556,599 A | 12/1985 | Sato et al. |
| 4,613,622 A | 9/1986 | Moeller et al. |
| 4,643,518 A | 2/1987 | Taniguchi |
| 4,673,914 A | 6/1987 | Lee |
| 4,705,839 A | 11/1987 | Martin |
| 4,714,308 A | 12/1987 | Sawamura et al. |
| 4,753,829 A | 6/1988 | Panush |
| 4,756,602 A | 7/1988 | Southwell et al. |
| 4,868,559 A | 9/1989 | Pinnow |
| 4,896,928 A | 1/1990 | Perilloux et al. |
| 5,007,710 A | 4/1991 | Nakajima et al. |
| 5,043,593 A | 8/1991 | Tsutsumi et al. |
| RE33,729 E | 10/1991 | Perilloux |
| 5,132,661 A | 7/1992 | Pinnow |
| 5,138,468 A | 8/1992 | Barbanell |
| 5,214,530 A | 5/1993 | Coombs et al. |
| 5,245,329 A | 9/1993 | Gokcebay |
| 5,279,657 A | 1/1994 | Phillips et al. |
| 5,283,431 A | 2/1994 | Rhine |
| 5,323,416 A | 6/1994 | Bhat et al. |
| 5,423,912 A | 6/1995 | Sullivan et al. |
| 5,424,119 A | 6/1995 | Phillips et al. |
| 5,437,931 A | 8/1995 | Tsai et al. |
| 5,472,798 A | 12/1995 | Kumazawa et al. |
| 5,491,470 A | 2/1996 | Veligdan |
| 5,543,665 A | 8/1996 | Demarco |
| 5,561,420 A | 10/1996 | Kleefeldt et al. |
| 5,569,332 A | 10/1996 | Glatfelter et al. |
| 5,569,353 A | 10/1996 | Zodrow |
| 5,569,535 A | 10/1996 | Phillips et al. |
| 5,570,847 A | 11/1996 | Phillips et al. |
| 5,571,624 A | 11/1996 | Phillips et al. |
| 5,653,792 A | 8/1997 | Phillips et al. |
| 5,691,844 A | 11/1997 | Oguchi et al. |
| 5,700,550 A | 12/1997 | Uyama et al. |
| 5,759,255 A | 6/1998 | Venturini et al. |
| 5,768,026 A | 6/1998 | Kiyomoto et al. |
| 5,850,309 A | 12/1998 | Shirai et al. |
| 5,889,603 A | 3/1999 | Roddy et al. |
| 5,982,078 A | 11/1999 | Krisl et al. |
| 6,049,419 A | 4/2000 | Wheatley et al. |
| 6,055,079 A | 4/2000 | Hagans et al. |
| 6,130,780 A | 10/2000 | Joannopoulos et al. |
| 6,150,022 A | 11/2000 | Coulter et al. |
| 6,156,115 A | 12/2000 | Pfaff et al. |
| 6,157,480 A | 12/2000 | Anderson et al. |
| 6,157,489 A | 12/2000 | Bradley, Jr. et al. |
| 6,157,498 A | 12/2000 | Takahashi |
| 6,180,025 B1 | 1/2001 | Schoenfeld et al. |
| 6,215,592 B1 | 4/2001 | Pelekhaty |
| 6,242,056 B1 | 6/2001 | Spencer et al. |
| 6,243,204 B1 | 6/2001 | Bradley, Jr. et al. |
| 6,249,378 B1 | 6/2001 | Shimamura et al. |
| 6,310,905 B1 | 10/2001 | Shirai |
| 6,331,914 B1 | 12/2001 | Wood, II et al. |
| 6,383,638 B1 | 5/2002 | Coulter et al. |
| 6,387,457 B1 | 5/2002 | Jiang et al. |
| 6,387,498 B1 | 5/2002 | Coulter et al. |
| 6,399,228 B1 | 6/2002 | Simpson |
| 6,433,931 B1 | 8/2002 | Fink et al. |
| 6,451,414 B1 | 9/2002 | Wheatley et al. |
| 6,475,273 B1 | 11/2002 | Zimmermann et al. |
| 6,534,903 B1 | 3/2003 | Spiro et al. |
| 6,565,770 B1 | 5/2003 | Mayer et al. |
| 6,569,527 B1 | 5/2003 | Calhoun et al. |
| 6,574,383 B1 | 6/2003 | Erchak et al. |
| 6,596,070 B1 | 7/2003 | Schmidt et al. |
| 6,618,149 B1 | 9/2003 | Stirton |
| 6,624,945 B2 | 9/2003 | Fan et al. |
| 6,667,095 B2 | 12/2003 | Wheatley et al. |
| 6,686,042 B1 | 2/2004 | LeGallee |
| 6,753,952 B1 | 6/2004 | Lawrence et al. |
| 6,844,976 B1 | 1/2005 | Firon et al. |
| 6,873,393 B2 | 3/2005 | Ma |
| 6,887,526 B1 | 5/2005 | Arlt et al. |
| 6,894,838 B2 | 5/2005 | Mizrahi et al. |
| 6,903,873 B1 | 6/2005 | Joannopoulos et al. |
| 6,913,793 B2 | 7/2005 | Jiang et al. |
| 6,927,900 B2 | 8/2005 | Liu et al. |
| 6,997,981 B1 | 2/2006 | Coombs et al. |
| 7,052,762 B2 | 5/2006 | Hebrink et al. |
| 7,064,897 B2 | 6/2006 | Hebrink et al. |
| 7,098,257 B2 | 8/2006 | Rink et al. |

(56) References Cited

U.S. PATENT DOCUMENTS

| | | |
|---|---|---|
| 7,106,516 B2 | 9/2006 | Lotz et al. |
| 7,123,416 B1 | 10/2006 | Erdogan et al. |
| 7,141,297 B2 | 11/2006 | Condo et al. |
| 7,184,133 B2 | 2/2007 | Coombs et al. |
| 7,190,524 B2 | 3/2007 | Grawert et al. |
| 7,215,473 B2 | 5/2007 | Fleming |
| 7,236,296 B2 | 6/2007 | Liu et al. |
| 7,267,386 B2 | 9/2007 | Hesch |
| 7,326,967 B2 | 2/2008 | Hsieh et al. |
| 7,329,967 B2 | 2/2008 | Nozawa et al. |
| 7,352,118 B2 | 4/2008 | Chowdhury et al. |
| 7,367,691 B2 | 5/2008 | Lin |
| 7,410,685 B2 | 8/2008 | Rosenberger et al. |
| 7,413,599 B2 | 8/2008 | Henglein et al. |
| 7,446,142 B2 | 11/2008 | Meisenburg et al. |
| 7,452,597 B2 | 11/2008 | Bujard |
| 7,483,212 B2 | 1/2009 | Cho et al. |
| 7,638,184 B2 | 12/2009 | Yaoita et al. |
| 7,667,895 B2 | 2/2010 | Argoitia et al. |
| 7,699,350 B2 | 4/2010 | Heim |
| 7,699,927 B2 | 4/2010 | Henglein et al. |
| 7,745,312 B2 | 6/2010 | Herner et al. |
| 7,847,342 B2 | 12/2010 | Fukuzumi et al. |
| 7,859,754 B2 | 12/2010 | Falicoff |
| 7,863,672 B2 | 1/2011 | Jin et al. |
| 7,903,339 B2 | 3/2011 | Banerjee et al. |
| 7,929,730 B2 | 4/2011 | Huang et al. |
| 7,980,711 B2 | 7/2011 | Takayanagi et al. |
| 8,013,383 B2 | 9/2011 | Kidoh et al. |
| 8,257,784 B2 | 9/2012 | Grayson et al. |
| 8,313,798 B2 | 11/2012 | Nogueira et al. |
| 8,323,391 B2 | 12/2012 | Banerjee et al. |
| 8,329,247 B2 | 12/2012 | Banerjee et al. |
| 8,350,314 B2 | 1/2013 | Fukuzumi et al. |
| 8,440,014 B2 | 5/2013 | Kitamura et al. |
| 8,446,666 B2 | 5/2013 | Kurt et al. |
| 8,593,728 B2 | 11/2013 | Banerjee et al. |
| 8,599,464 B2 | 12/2013 | Park |
| 8,619,365 B2 | 12/2013 | Harris et al. |
| 8,736,959 B2 | 5/2014 | Grayson et al. |
| 9,063,291 B2 | 6/2015 | Banerjee et al. |
| 2001/0022151 A1 | 9/2001 | Sliwinski et al. |
| 2002/0030882 A1 | 3/2002 | Vitt et al. |
| 2002/0096087 A1 | 7/2002 | Glausch |
| 2002/0117080 A1 | 8/2002 | Okutsu et al. |
| 2002/0129739 A1 | 9/2002 | Yanagimoto et al. |
| 2003/0002157 A1 | 1/2003 | Someno |
| 2003/0059549 A1 | 3/2003 | Morrow et al. |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0191540 A1 | 9/2004 | Jakobi et al. |
| 2004/0246477 A1 | 12/2004 | Moon et al. |
| 2004/0252509 A1 | 12/2004 | Lin |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0132929 A1 | 6/2005 | Raksha et al. |
| 2005/0152417 A1 | 7/2005 | Lin |
| 2005/0235714 A1 | 10/2005 | Lindstrom |
| 2005/0264874 A1 | 12/2005 | Lin |
| 2006/0006402 A1 | 1/2006 | Hsieh et al. |
| 2006/0030656 A1 | 2/2006 | Tarng et al. |
| 2006/0081858 A1 | 4/2006 | Lin et al. |
| 2006/0145172 A1 | 7/2006 | Su et al. |
| 2006/0155007 A1 | 7/2006 | Huber |
| 2006/0159922 A1 | 7/2006 | O'Keefe |
| 2006/0222592 A1 | 10/2006 | Burda |
| 2007/0097509 A1 | 5/2007 | Nevitt et al. |
| 2007/0221097 A1 | 9/2007 | Tarng et al. |
| 2009/0046368 A1 | 2/2009 | Banerjee et al. |
| 2009/0082659 A1 | 3/2009 | Ham et al. |
| 2009/0153953 A1 | 6/2009 | Banerjee et al. |
| 2009/0161220 A1 | 6/2009 | Banerjee et al. |
| 2009/0241802 A1 | 10/2009 | Nemoto et al. |
| 2009/0303044 A1 | 12/2009 | Furuichi et al. |
| 2009/0321693 A1 | 12/2009 | Ohkuma et al. |
| 2010/0064938 A1 | 3/2010 | Voit et al. |
| 2010/0208338 A1 | 8/2010 | Banerjee et al. |
| 2010/0209593 A1 | 8/2010 | Banerjee et al. |
| 2010/0213485 A1 | 8/2010 | Mckenzie et al. |
| 2011/0091658 A1 | 4/2011 | Banerjee et al. |
| 2011/0113984 A1 | 5/2011 | Fuller, Jr. et al. |
| 2011/0128616 A1 | 6/2011 | Banerjee et al. |
| 2011/0134515 A1 | 6/2011 | Banerjee et al. |
| 2011/0228399 A1 | 9/2011 | Ohnishi |
| 2011/0299154 A1 | 12/2011 | Grayson et al. |
| 2012/0050848 A1 | 3/2012 | Carlson et al. |
| 2012/0107584 A1 | 5/2012 | Eibon et al. |
| 2012/0307369 A1 | 12/2012 | Banerjee et al. |
| 2013/0148221 A1 | 6/2013 | Banerjee et al. |
| 2013/0213260 A1 | 8/2013 | Kunii |
| 2013/0265668 A1 | 10/2013 | Banerjee et al. |
| 2014/0018439 A1 | 1/2014 | Gruner et al. |
| 2014/0111861 A1 | 4/2014 | Banerjee et al. |
| 2014/0211303 A1 | 7/2014 | Banerjee et al. |

FOREIGN PATENT DOCUMENTS

| | | |
|---|---|---|
| DE | 2106613 A1 | 8/1971 |
| EP | 141143 A2 | 5/1985 |
| JP | 07034324 | 2/1995 |
| JP | 2000220331 A | 8/2000 |
| JP | 2000329933 A | 11/2000 |
| JP | 2005144925 A | 6/2005 |
| JP | 2006506518 A | 2/2006 |
| JP | 2006097426 A | 4/2006 |
| JP | 2008038382 A | 2/2008 |
| WO | 99/42892 A1 | 8/1999 |
| WO | 00/22466 A1 | 4/2000 |
| WO | 0031571 A1 | 6/2000 |
| WO | 02054030 A2 | 7/2002 |
| WO | 03062871 A1 | 7/2003 |

OTHER PUBLICATIONS

Distributed Bragg Reflector; en.wikipedia.org/wiki/Distributed_Bragg_reflector.

Photonic Crystal; en.wikipedia.org/wiki/Photonic_crystal.

Tikhonravov, et al., "Application Of The Needle Optimization Technique To The Design Of Optical Coatings", Applied Optics, Optical Society of America, 1996, pp. 5493-5508, vol. 35, No. 28.

Deopura, M. et al., "Dielectric Omnidirectional Visible Reflector." Optical Society of America; vol. 26, No. 15; Department of Material Science and Engineering, Massachusetts Institute of Technology; pp. 1197-1199; Aug. 1, 2001.

Bing-Xin Wei et al., "Detrimental Thixotropic Thinning of Filter Cake of SiO2-Al2O3 Composite Coated TiO2 Particles and Its Control", Industrial & Engineering Chemistry Research, Sep. 27, 2011, 50, pp. 13799-13804.

Tikhonravov, Alexander V. et al., "Optical Coating Design Algorithm Based on the Equivalent Layers Theory", Applied Optics: vol. 45, No. 7; Mar. 2006; pp. 1530-1538.

Kaminska, Kate et al., "Birefringent Omnidirectional Reflector", Applied Optics, vol. 43, No. 7, Mar. 2004, pp. 1570-1576.

Hongqiang et al, "Disordered dielectric high reflectors with broadband from visible to infrared," Applied Physics Letters, American Institute of Physics, Melville, NY, US, vol. 74, No. 22, 1999.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

"Laser 2000 Gmbhttp://www.laser2000.de/fileadmin/Produkdaten/SK_WEB/Datenblaetter_SEM/SEMROCK-StopLine-Notchfilter.pdf, accessed Feb. 2, 2010".

Bendiganavale A.K., Malshe, V.C., "Infrared Reflective Inorganic Pigments", Recent Patents On Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

(56) References Cited

OTHER PUBLICATIONS

Maier, E.J. "To Deal With the Invisible: On the biological significance of ultraviolet sensitivity in birds." Naturwissenschaften 80: 476-478, 1993.

Nixon, J., "Twinkle, Twinkle, Little Star," Asia Pacific Coatings Journal, Feb. 2004.

Fink, Yoel et al., "A Dielectric Omnidirectional Reflector", Science, vol. 282, Nov. 27, 1998.

Lin, Weihua et al., "Design and Fabrication of Omnidirectional Reflectors in the Visible Range", Journal of Modern Optics, vol. 52, No. 8, 1155 (2005).

Chen, Kevin M. et al., "SiO2/TiO2 Omnidirectional Reflector and Microcavity Resonator Via the Sol-Gel Method", Appl. Phys. Lett., vol. 75, No. 24, Dec. 13, 1999.

Almeida, R.M. et al., "Photonic Bandgap Materials and Structures by Sol-Gel Processing", Journal of Non-Crystalline Solids, 405-409 (2003).

Decorby, R.G., "Planar Omnidirectional Reflectors in Chalcogenide Glass and Polymer" Optics Express, 6228, Aug. 8, 2005.

Clement, T.J. et al., "Improved Omnidirectional Reflectors in Chalcogenide Glass and Polymer by Using the Silver Doping Technique", Optics Express, 14, 1789 (2006).

Bruyant, A. et al., "All-Silicon Omnidirectional Mirrors Based on One-Dimensional Photonic Crystals", Appl. Phys. Lett. vol. 82, No. 19, May 12, 2003.

Chigrin, D.N. et al., "Observation of Total Omnidirectional Reflection From a One-Dimensional Dielectric Lattice", Appl. Phys. A. 68, 25-28 (1999).

Park, Y. et al., "GaAs-based Near-infrared Omnidirectional Reflector", Appl. Phys. Lett., vol. 82, No. 17, Apr. 28, 2003.

Lee, H.Y., "Design and Evaluation of Omnidirectional One-Dimensional Photonic Crystals", Journal of Appl. Phys. vol. 93, No. 2, Jan. 15, 2003.

Banerjee, D., "Narrow-band Omnidirectional Structural Color", SAE World Congress 01-1049 (2008).

Medium: Air or Polymer

Air or Polymer

Hue = 36

Hue = 26

Hue = 354

RED OMNIDIRECTIONAL STRUCTURAL COLOR MADE FROM METAL AND DIELECTRIC LAYERS

CROSS-REFERENCE TO RELATED APPLICATIONS

The instant application is a continuation-in-part (CIP) of U.S. patent application Ser. No. 14/460,511 filed on Aug. 15, 2014, which in turn is a CIP of U.S. patent application Ser. No. 14/242,429 filed on Apr. 1, 2014, which in turn is a CIP of U.S. patent application Ser. No. 14/138,499 filed on Dec. 23, 2013, which in turn is a CIP of U.S. patent application Ser. No. 13/913,402 filed on Jun. 8, 2013, which in turn is a CIP of U.S. patent application Ser. No. 13/760,699 filed on Feb. 6, 2013, which in turn is a CIP of Ser. No. 13/572,071 filed on Aug. 10, 2012, which in turn is a CIP of U.S. patent application Ser. No. 13/021,730 filed on Feb. 5, 2011, which in turn is a CIP of Ser. No. 12/793,772 filed on Jun. 4, 2010 (U.S. Pat. No. 8,736,959), which in turn is a CIP of Ser. No. 12/388,395 filed on Feb. 18, 2009 (U.S. Pat. No. 8,749,881), which in turn is a CIP of U.S. patent application Ser. No. 11/837,529 filed Aug. 12, 2007 (U.S. Pat. No. 7,903,339). U.S. patent application Ser. No. 13/913,402 filed on Jun. 8, 2013 is a CIP of Ser. No. 13/014,398 filed Jan. 26, 2011, which is a CIP of Ser. No. 12/793,772 filed Jun. 4, 2010. U.S. patent application Ser. No. 13/014,398 filed Jan. 26, 2011 is a CIP of Ser. No. 12/686,861 filed Jan. 13, 2010 (U.S. Pat. No. 8,593,728), which is a CIP of Ser. No. 12/389,256 filed Feb. 19, 2009 (U.S. Pat. No. 8,329,247), all of which are incorporated in their entirety by reference.

FIELD OF THE INVENTION

The present invention is related to an omnidirectional structural color, and in particular to a red omnidirectional structural color provided by a multilayer stack having an absorber layer and a dielectric layer.

BACKGROUND OF THE INVENTION

Pigments made from multilayer structures are known. In addition, pigments that exhibit or provide a high-chroma omnidirectional structural color are also known. However, such prior art pigments have required as many as 39 thin film layers in order to obtain desired color properties.

It is appreciated that cost associated with the production of thin film multilayer pigments is proportional to the number of layers required. As such, the cost associated with the production of high-chroma omnidirectional structural colors using multilayer stacks of dielectric materials can be prohibitive. Therefore, a high-chroma omnidirectional structural color that requires a minimum number of thin film layers would be desirable.

SUMMARY OF THE INVENTION

A multilayer stack that affords a red omnidirectional structural color is provided. The multilayer stack includes a core layer, a semiconductor layer extending across the core layer, and a dielectric layer extending across the dielectric layer. The semiconductor layer absorbs more than 70% of incident white light that has a wavelength less than 550 nanometers (nm). In addition, the dielectric layer in combination with the core layer reflects more than 70% of incident white light with a wavelength generally greater than 550 nm. In combination, the core layer, semiconductor layer, and dielectric layer form an omnidirectional reflector that: (1) reflects a narrow band of visible electromagnetic radiation (reflection peak or band) with a center wavelength between 550-700 nm and a width of less than 200 nm wide; and (2) has a color shift of less than 100 nm when the omnidirectional reflector is viewed from angles between 0 and 45 degrees. In some instances, the width of the narrow band of reflected visible electromagnetic radiation is less than 175 nm, preferably less than 150 nm, more preferably less than 125 nm, and still more preferably less than 100 nm.

Pigments can be manufactured from the multilayer stack by producing a coating of the multilayer stack onto a web using a sacrificial layer. Once the sacrificial layer is removed, the lifted off coating is ground into free standing flakes that have a maximum surface dimension of 20 µm and a thickness between 0.3-1.5 µm. The flakes can then be mixed with polymeric materials such as binders, additives, a base coat resin, etc., to provide an omnidirectional structural color paint.

DETAILED DESCRIPTION OF THE INVENTION

Figure 1A:
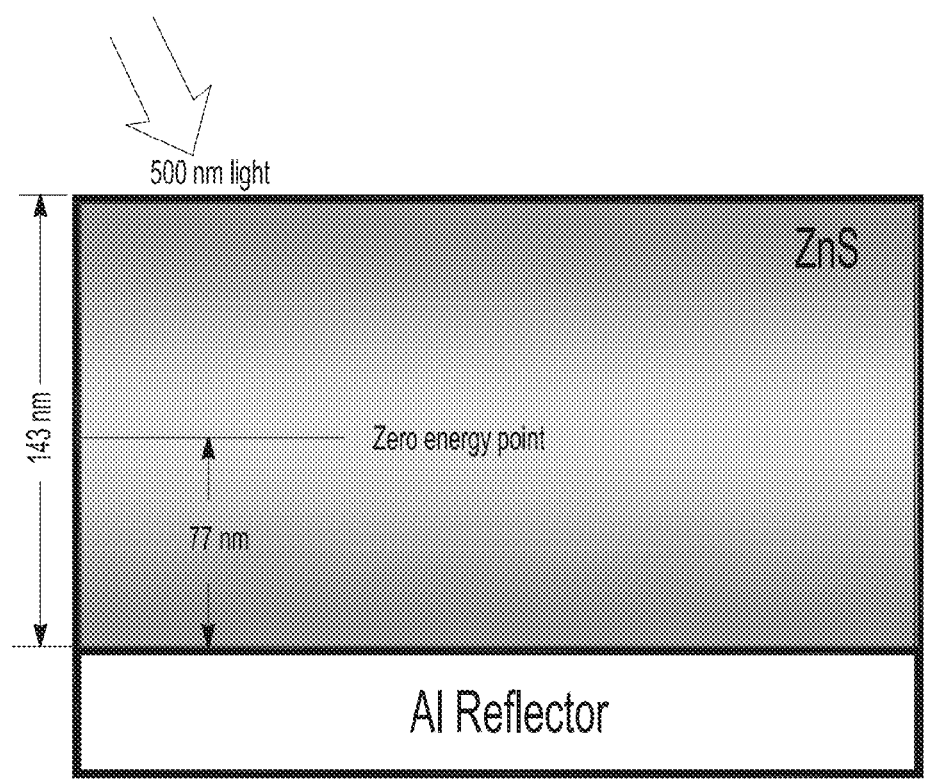
FIG. 1A is a schematic illustration of a zero or near-zero electric field point within a ZnS dielectric layer exposed to electromagnetic radiation (EMR) having a wavelength of 500 nm.

A multilayer stack affording an omnidirectional structural color, e.g. a red omnidirectional color, is provided. As such, the multilayer stack has use as a paint pigment, a thin film that provides a desired color, and the like.

The multilayer stack affording the omnidirectional structural color includes a core layer, a semiconductor layer extending across the core layer and a dielectric layer extending across the semiconductor layer. The semiconductor layer absorbs more than 70% of incident white light that has a wavelength less than 550 nm. The dielectric layer in combination with the core layer reflects more than 70% of incident white light that has a wavelength greater than 550 nm. It is appreciated that the thickness of the dielectric layer can be predefined such that the wavelength at which greater than 70% of incident white light that is reflected is greater than 550 nm, 560 nm, 580 nm, 600 nm, 620 nm, 640 nm, 660 nm, 680 nm or wavelengths therebetween. Stated differently, the thickness of the dielectric layer can be chosen and produced such that a particular color having a desired hue between 35 and 350, chroma and/or lightness on a Lab color system map is reflected and observed by the human eye. Also, for the purposes of the instant disclosure, hue is defined as $\tan^{-1}(b/a)$ where a and b are color coordinates in the Lab color system.

In some instances, the multilayer stack has a hue between 315° and 45° in lab color space. Also, the multilayer stack has a chroma greater than 50 and a hue shift of less than 30°. In other instances the chroma is greater than 55, preferably greater than 60, and more preferably greater than 65, and/or the hue shift is less than 25°, preferably less than 20°, more preferably less than 15° and still more preferably less than 10°.

In some instances, the core layer and the dielectric layer reflect more than 80% of incident white light that has a wavelength generally greater than 550 nm, and in other instances more than 90%. Also, in some instances the semiconductor layer absorbs more than 80% of wavelengths generally less than 550 nm, and in other instances more than 90%.

It is appreciated that the term "generally" in this context, refers to plus and/or minus 20 nm in some instances, plus and/or minus 30 nm in other instances, plus and/or minus 40 nm in still other instances and plus and/or minus 50 nm in still yet other instances.

The core layer, the semiconductor layer, and the dielectric layer form an omnidirectional reflector that reflects a narrow band of electromagnetic radiation (hereafter referred to as reflection peak or reflection band) with a center wavelength between 550 nm and the visible-IR edge of the EMR spectrum. The reflection band has a width of less than 200 nm, and a color shift of less than 100 nm when the omnidirectional reflector is exposed to white light and viewed from angles between 0 and 45 degrees. The color shift can be in the form of a shift of a center wavelength of the reflection band, or in the alternative, a shift of a UV-sided edge of the reflection band. For purposes of the present invention, the width of the reflected band of electromagnetic radiation is defined as the width of the reflection band at half the reflected height of the maximum reflected wavelength within the visible spectrum. In addition, the narrow band of reflected electromagnetic radiation, i.e. the "color" of the omnidirectional reflector, has a hue shift of less than 35 degrees, and in some instances, less than 25 degrees.

The core layer has a thickness between 50-200 nm and can be a reflector core layer, an absorber/reflector core layer or a dielectric layer. The reflector core layer is made from a reflector material such as aluminum (Al), silver (Ag), platinum (Pt) and/or alloys thereof. The absorber/reflector core layer is made from an absorber/reflector material such as chromium (Cr), copper (Cu), gold (Au), tin (Sn) and/or alloys thereof. The dielectric core layer is made from a dielectric material such as glass and/or mica, or in the alternative, a colorful dielectric core layer made from a colorful dielectric material such as $Fe_2O_3$, $Cu_2O$ and/or combinations thereof.

The semiconductor layer has a thickness between 5-400 nm and is made from a semiconductor material such as silicon (Si), amorphous Si, germanium (Ge), or other semiconductor layer that has electronic bandgap in the visible range of the electromagnetic wave spectrum and combinations thereof. It is appreciated that the use of the term Si refers to crystalline Si.

The dielectric layer has a thickness between 0.1 QW-4.0 QW for a desired control wavelength, the control wavelength determined by a desired target wavelength in the visible light spectrum. The dielectric layer made from a dielectric material has a refractive index greater than 1.6 such as ZnS, $TiO_2$, $Si_3N_4$, $HfO_2$, $Nb_2O_5$, $Ta_2O_5$ and combinations thereof. In some instances, the dielectric layer is a colorful dielectric layer made from a colorful dielectric material such as $Fe_2O_3$, $Cu_2O$ and combinations thereof.

In one embodiment disclosed herein, the omnidirectional reflector includes an optional partial absorber layer that extends between the semiconductor layer and the dielectric layer. The partial absorber layer has a thickness between 2-30 nm and can be made from a material selected such as Cr, Cu, Au, Sn and alloys thereof.

In another embodiment, the omnidirectional reflector includes a second semiconductor layer in addition to the previous mentioned semiconductor layer (also known as the first semiconductor layer). In addition, the second semiconductor layer extends across the dielectric layer and is oppositely disposed the first semiconductor layer about the dielectric layer. In the event that a second semiconductor layer is present, the omnidirectional reflector can also include a second dielectric layer in addition to the previous mentioned dielectric layer (also known as the first dielectric layer) that extends across the second semiconductor layer and is oppositely disposed the first dielectric layer about the second semiconductor layer.

The semiconductor layer is selected to absorb a desired range of wavelengths within the white light spectrum and reflect another desired range of the white light spectrum. For example, the semiconductor layer can be designed and manufactured such that it absorbs electromagnetic radiation with wavelengths corresponding to violet, blue, green, yellow (e.g., 400-550 nm) and yet reflects electromagnetic radiation corresponding to red (i.e., 580-infra-red (IR) range).

The overall thickness of multilayer stacks that make up the omnidirectional reflector disclosed herein is less than 2 microns (µm), in some instances less than 1.5 µm, in other instances less than 1.0 µm, and in still other instances less than 0.75 µm.

In some instances, the dielectric layer has an optical thickness between 0.1 and 2.0 QW, while in other instances, the dielectric layer has a thickness between 0.1 and 1.8 QW. In still yet other instances, the dielectric layer has an optical thickness less than 1.9 QW, for example less than 1.8 QW, less than 1.7 QW, less than 1.6 QW, less than 1.5 QW, less than 1.4 QW, less than 1.3 QW, less than 1.2 QW or less than 1.1 QW. In the alternative, the dielectric layer has an optical thickness greater than 2.0 QW.

The dielectric layer has a refractive index greater than 1.60, 1.62, 1.65 or 1.70, and can be made from a dielectric material such as ZnS, $Si_3N_4$, $TiO_2$, $HfO_2$, $Nb_2O_5$, $Ta_2O_5$, combinations thereof, and the like. In some instances, the dielectric layer is a colorful or selective dielectric layer made from a colorful dielectric material such as $Fe_2O_3$, $Cu_2O$, and the like. For the purposes of the present invention, the term "colorful dielectric material" or "colorful dielectric layer" refers to a dielectric material or dielectric layer that transmits only a portion of incident white light while reflecting another portion of white light. For example, the colorful dielectric layer can transmit electromagnetic radiation having wavelengths between 400 and 600 nm and reflect wavelengths greater than 600 nm. As such, the colorful dielectric material or colorful dielectric layer has a visual appearance of orange, red and/or reddish-orange.

The location of the dielectric layer is such that a zero or near-zero energy interface is present between an absorber layer or a semiconductor layer and the dielectric layer. Stated differently, the dielectric layer has a thickness such that a zero or near-zero energy field is located at the dielectric layer-semiconductor layer or dielectric layer-absorber layer interface. It is appreciated that the thickness of the dielectric layer at which the zero or near-zero energy field is present is a function of the incident EMR wavelength. In addition, it is also appreciated that the wavelength corresponding to the zero or near-zero electric field will be transmitted through the dielectric layer-semiconductor layer interface or dielectric layer-absorber layer interface whereas wavelengths not corresponding to the zero or near-zero electric field at the interface will not pass therethrough. As such, the thickness of the dielectric layer is designed and manufactured such that a desired wavelength of incident white light is transmitted through the dielectric layer-semiconductor layer interface or dielectric layer-absorber layer interface, reflected off of the core layer, and then transmitted back through the dielectric layer-semiconductor layer interface or dielectric layer-absorber layer interface. Likewise, the thickness of the dielectric layer is manufactured such that undesired wavelengths of incident white light are not transmitted through the dielectric layer-semiconductor layer interface or dielectric layer-absorber layer interface.

Given the above, wavelengths not corresponding to the desired zero or near-zero electric field interface are absorbed by the semiconductor layer or absorber layer and thus not reflected. In this manner, a desired "sharp" color, also known as a structural color, is provided. In addition, the thickness of the dielectric layer is such that reflection of desired first harmonics and/or second harmonics is produced in order to provide a surface with a red color that also has an omnidirectional appearance.

Regarding the thickness of the dielectric layer and the zero or near-zero electric field point with respect to an absorber layer mentioned above, FIG. 1A is a schematic illustration of a ZnS dielectric layer extending across an Al reflector layer. The ZnS dielectric layer has a total thickness of 143 nm, and for incident electromagnetic radiation with a wavelength of 500 nm, a zero or near zero energy point is present at 77 nm. Stated differently, the ZnS dielectric layer exhibits a zero or near-zero electric field at a distance of 77 nm from the Al reflector layer for incident EMR having a wavelength of 500 nm. In addition, FIG. 1B provides a graphical illustration of the energy field across the ZnS dielectric layer for a number of different incident EMR wavelengths. As shown in the graph, the dielectric layer has a zero electric field for the 500 nm wavelength at 77 nm thickness, but a non-zero electric field at the 77 nm thickness for EMR wavelengths of 300, 400, 600 and 700 nm.

Figure 1B:
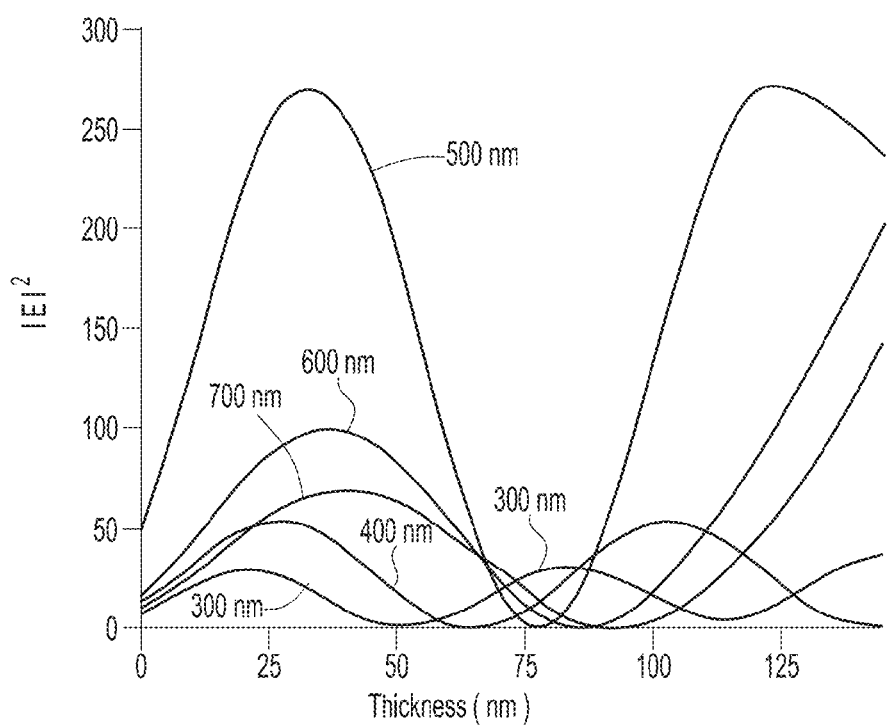
FIG. 1B is a graphical illustration of the absolute value of electric field squared ($|E|^2$) versus thickness of the ZnS dielectric layer shown in FIG. 1A when exposed to EMR having wavelengths of 300, 400, 500, 600 and 700 nm.

Not being bound by theory, calculation of the zero or near zero energy point thickness for a dielectric layer such as the one illustrated in FIG. 1A is discussed below.

Figure 2:
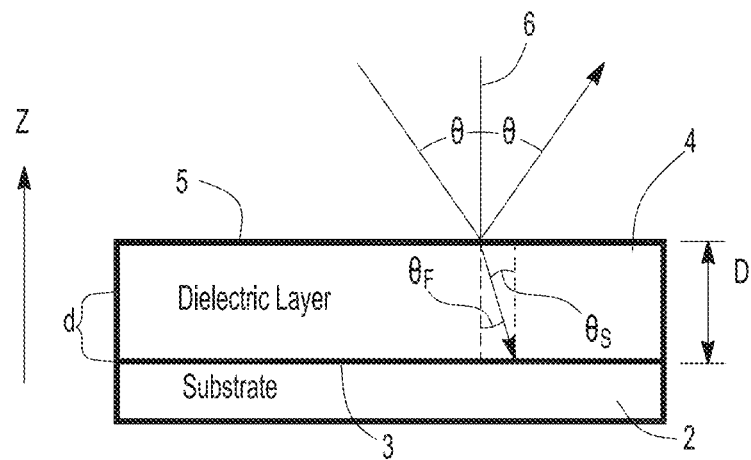
FIG. 2 is a schematic illustration of a dielectric layer extending over a substrate or reflector layer and exposed to electromagnetic radiation at an angle $\theta$ relative to a normal direction to the outer surface of the dielectric layer.

Referring to FIG. 2, a dielectric layer 4 having a total thickness 'D', an incremental thickness 'd' and an index of refraction 'n' on a substrate or core layer 2 having a index of refraction $n_s$ is shown. Incident light strikes the outer surface 5 of the dielectric layer 4 at angle θ relative to line 6, which is perpendicular to the outer surface 5, and reflects from the outer surface 5 at the same angle. Incident light is transmitted through the outer surface 5 and into the dielectric layer 4 at an angle $\theta_F$ relative to the line 6 and strikes the surface 3 of substrate layer 2 at an angle $\theta_s$.

For a single dielectric layer, $\theta_s = \theta_F$ and the energy/electric field (E) can be expressed as E(z) when z=d. From Maxwell's equations, the electric field can be expressed for s polarization as:

$$\vec{E}(d) = \{u(z),0,0\} \exp(ik\alpha y)|_{z=d} \quad (1)$$

and for p polarization as:

$$\vec{E}(d) = \left\{0, u(z), -\frac{\alpha}{\varepsilon(z)}v(z)\right\}\exp(ik\alpha y)\bigg|_{z=d} \quad (2)$$

where $$k = \frac{2\pi}{\lambda}$$

and λ is a desired wavelength to be reflected. Also, $\alpha = n_s \sin\theta_s$ where 's' corresponds to the substrate in FIG. 1 and $\varepsilon(z)$ is the permittivity of the layer as a function of z. As such, $$|E(d)|^2 = |u(z)|^2 \exp(2ik\alpha y)|_{z=d} \quad (3)$$

for s polarization and $$|E(d)|^2 = \left[|u(z)|^2 + \left|\frac{\alpha}{\sqrt{n}}v(z)\right|^2\right]\exp(2ik\alpha y)\bigg|_{z=d} \quad (4)$$

for p polarization.

It is appreciated that variation of the electric field along the Z direction of the dielectric layer 4 can be estimated by calculation of the unknown parameters u(z) and v(z) where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix}\begin{pmatrix} u \\ v \end{pmatrix}_{z=0, substrate} \quad (5)$$

Naturally, 'i' is the square root of −1. Using the boundary conditions $u|_{z=0}=1$, $v|_{z=0}=q_s$, and the following relations:

$$q_s = n_s \cos\theta_s \text{ for } s\text{-polarization} \quad (6)$$

$$q_s = n_s/\cos\theta_s \text{ for } p\text{-polarization} \quad (7)$$

$$q = n \cos\theta_F \text{ for } s\text{-polarization} \quad (8)$$

$$q = n/\cos\theta_F \text{ for } p\text{-polarization} \quad (9)$$

$$\varphi = k \cdot n \cdot d \cos(\theta_F) \quad (10)$$

u(z) and v(z) can be expressed as:

$$u(z)|_{z=d} = u\bigg|_{z=0}\cos\varphi + v\bigg|_{z=0}\left(\frac{i}{q}\sin\varphi\right) \quad (11)$$
$$= \cos\varphi + \frac{i \cdot q_s}{q}\sin\varphi$$

and $$v(z)|_{z=d} = iqu|_{z=0}\sin\varphi + v|_{z=0}\cos\varphi \quad (12)$$
$$= iq\sin\varphi + q_s\cos\varphi$$

Therefore:

$$|E(d)|^2 = \left[\cos^2\varphi + \frac{q_s^2}{q^2}\sin^2\varphi\right]e^{2ik\alpha y} \quad (13)$$
$$= \left[\cos^2\varphi + \frac{n_s^2}{n^2}\sin^2\varphi\right]e^{2ik\alpha y}$$

for s polarization with $\varphi = k \cdot n \cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (14)$$
$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s \sin\theta_s = n\sin\theta_F \quad (15)$$

-continued $$q_s = \frac{n_s}{\cos\theta_s} \quad (16)$$

and $$q_s = \frac{n}{\cos\theta_F} \quad (17)$$

Thus for a simple situation where $\theta_F=0$ or normal incidence, $\phi=k\cdot n\cdot d$, and $\alpha=0$:

$$|E(d)|^2 \text{ for } s\text{-polarization} = |E(d)|^2 \text{ for } p\text{-polarization} \quad (18)$$

$$= \left[\cos^2\varphi + \frac{n_s^2}{n^2}\sin^2\varphi\right]$$

$$= \left[\cos^2(k\cdot n\cdot d) + \frac{n_s^2}{n^2}\sin^2(k\cdot n\cdot d)\right] \quad (19)$$

which allows for the thickness 'd' to be solved for, i.e. the position or location within the dielectric layer where the electric field is zero.

Figure 3:
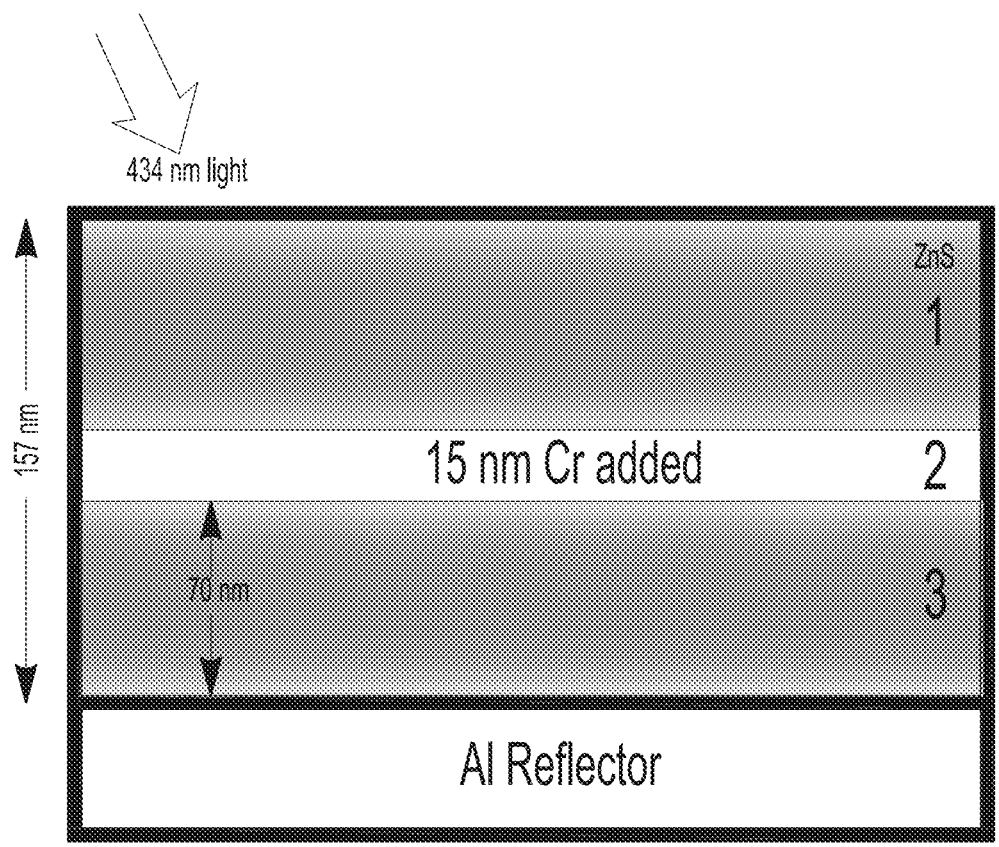
FIG. 3 is a schematic illustration of a ZnS dielectric layer with a Cr absorber layer located at the zero or near-zero electric field point within the ZnS dielectric layer for incident EMR having a wavelength of 434 nm.

Referring now to FIG. 3, Equation 19 was used to calculate that the zero or near-zero electric field point in the ZnS dielectric layer shown in FIG. 1A when exposed to EMR having a wavelength of 434 nm is at 70 nm (instead of 77 nm for a 500 nm wavelength). In addition, a 15 nm thick Cr absorber layer was inserted at a thickness of 70 nm from the Al reflector layer to afford for a zero or near-zero electric field ZnS—Cr interface. Such an inventive structure allows light having a wavelength of 434 nm to pass through the Cr—ZnS interfaces, but absorbs light not having a wavelength of 434 nm Stated differently, the Cr—ZnS interfaces have a zero or near-zero electric field with respect to light having a wavelength of 434 nm and thus 434 nm light passes through the interfaces. However, the Cr—ZnS interfaces do not have a zero or near-zero electric field for light not having a wavelength of 434 nm and thus such light is absorbed by the Cr absorber layer and/or Cr—ZnS interfaces and not reflected by the Al reflector layer.

It is appreciated that some percentage of light within +/−10 nm of the desired 434 nm will pass through the Cr—ZnS interface. However, it is also appreciated that such a narrow band of reflected light, e.g. 434+/−10 nm, still provides a sharp structural color to a human eye.

Figure 4:
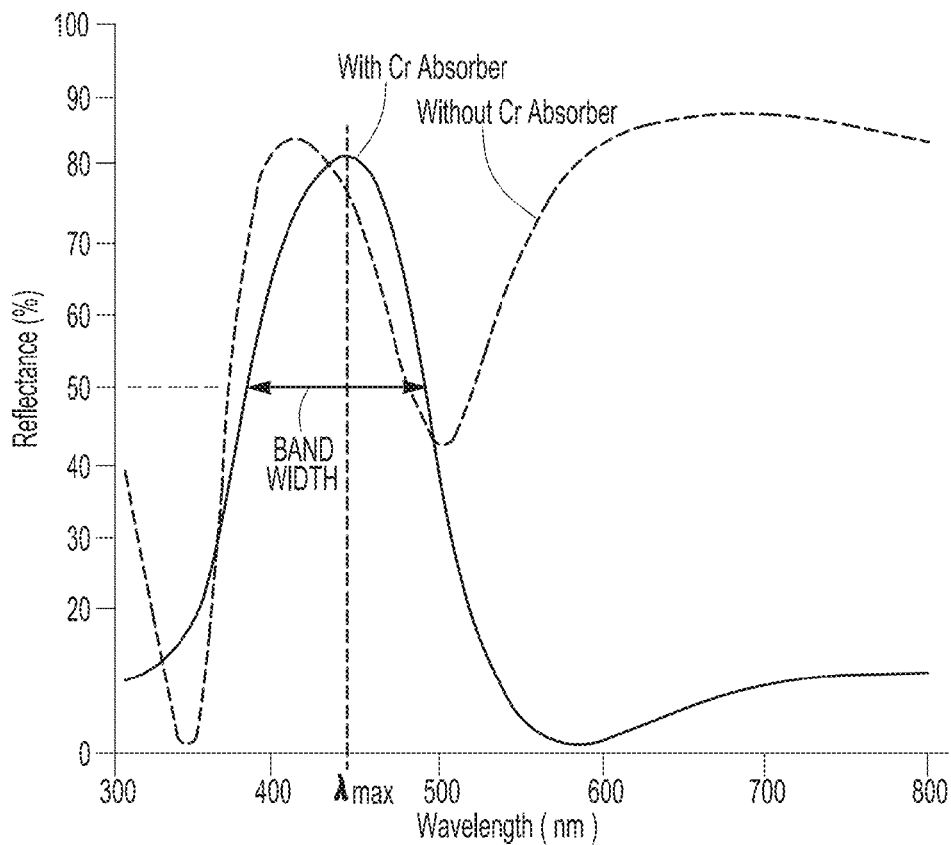
FIG. 4 is a graphical representation of percent reflectance versus reflected EMR wavelength for a multilayer stack without a Cr absorber layer (e.g., FIG. 1A) and a multilayer stack with a Cr absorber layer (e.g., FIG. 3A) exposed to white light.

The result of the Cr absorber layer in the multilayer stack in FIG. 3 is illustrated in FIG. 4 where percent reflectance versus reflected EMR wavelength is shown. As shown by the dotted line, which corresponds to the ZnS dielectric layer shown in FIG. 3 without a Cr absorber layer, a narrow reflected peak is present at about 400 nm, but a much broader peak is present at about 550+ nm. In addition, there is still a significant amount of light reflected in the 500 nm wavelength region. As such, a double peak that prevents the multilayer stack from having or exhibiting a structural color is present.

In contrast, the solid line in FIG. 4 corresponds to the structure shown in FIG. 3 with the Cr absorber layer present. As shown in the figure, a sharp peak at approximately 434 nm is present and a sharp drop off in reflectance for wavelengths greater than 434 nm is afforded by the Cr absorber layer. It is appreciated that the sharp peak represented by the solid line visually appears as sharp/structural color. Also, FIG. 4 illustrates where the width of a reflected peak or band is measured, i.e. the width of the band is determined at 50% reflectance of the maximum reflected wavelength, also known as full width at half maximum (FWHM).

Regarding omnidirectional behavior of the multilayer structure shown in FIG. 3, the thickness of the ZnS dielectric layer can be designed or set such that only the first harmonics of reflected light is provided. It is appreciated that this is sufficient for a "blue" color, however the production of a "red" color requires additional considerations. For example, the control of angular independence for red color is difficult since thicker dielectric layers are required, which in turn results in a high harmonic design, i.e. the presence of the second and possible third harmonics is inevitable. Also, the dark red color hue space is very narrow. As such, a red color multilayer stack has a higher angular variance.

Figure 5A:
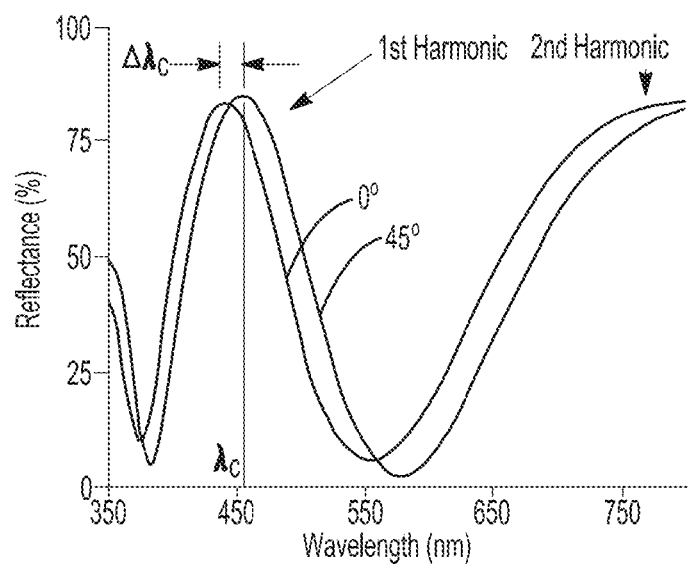
FIG. 5A is a graphical illustration of first harmonics and second harmonics exhibited by a ZnS dielectric layer extending over an Al reflector layer (e.g., FIG. 1A)

In order to overcome the higher angular variance for red color, the instant application discloses a unique and novel design/structure that affords for a red color that is angular independent. For example, FIG. 5A illustrates a dielectric layer exhibiting first and second harmonics for incident white light when an outer surface of the dielectric layer is viewed from 0 and 45 degrees. As shown by the graphical representation, low angular dependence (small $\Delta\lambda_c$) is provided by the thickness of the dielectric layer, however, such a multilayer stack has a combination of blue color (1$^{st}$ harmonic) and red color (2$^{nd}$ harmonic) and thus is not suitable for a desired "red only" color. Therefore, the concept/structure of using an absorber layer to absorb an unwanted harmonic series has been developed. FIG. 5A also illustrates an example of the location of the reflected band center wavelength ($\lambda_c$) for a given reflection peak and the dispersion or shift of the center wavelength ($\Delta\lambda_c$) when the sample is viewed from 0 and 45 degrees.

Figure 5B:
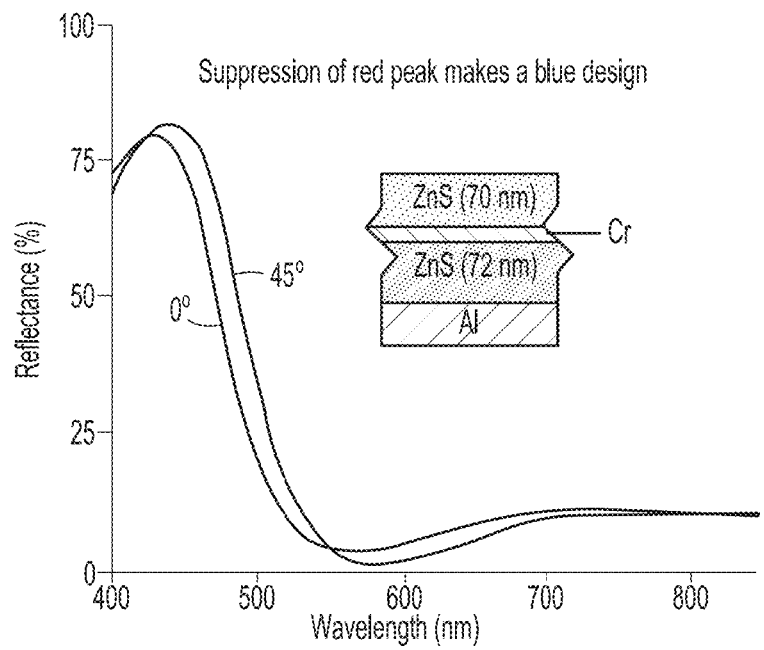
FIG. 5B is a graphical illustration of percent reflectance versus reflected EMR wavelength for a multilayer stack with a ZnS dielectric layer extending across an Al reflector layer, plus a Cr absorber layer located within the ZnS dielectric layer such that the second harmonics shown in FIG. 5A are absorbed.
Figure 5C:
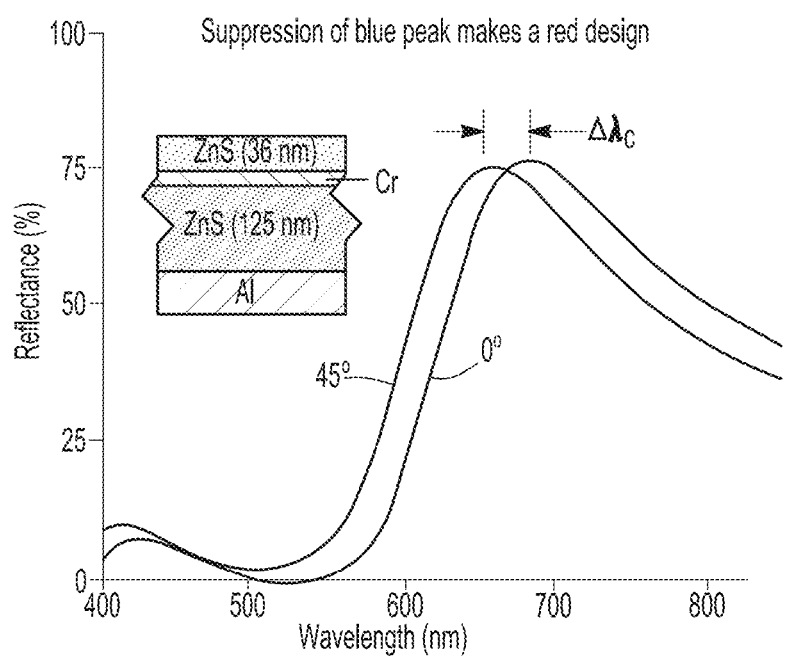
FIG. 5C is a graphical illustration of percent reflectance versus reflected EMR wavelength for a multilayer stack with a ZnS dielectric layer extending across an Al reflector layer, plus a Cr absorber layer located within the ZnS dielectric layer such that the first harmonics shown in FIG. 5A are absorbed.

Turning now to FIG. 5B, the second harmonic shown in FIG. 5A is absorbed with a Cr absorber layer at the appropriate dielectric layer thickness (e.g. 72 nm) and a sharp blue color is provided. More importantly for the instant invention, FIG. 5C illustrates that by absorbing the first harmonics with the Cr absorber at a different dielectric layer thickness (e.g. 125 nm) a red color is provided. However, FIG. 5C also illustrates that the use of the Cr absorber layer still results in more than desired angular dependence by the multilayer stack, i.e. a larger than desired $\Delta\lambda_c$.

Figure 6A:
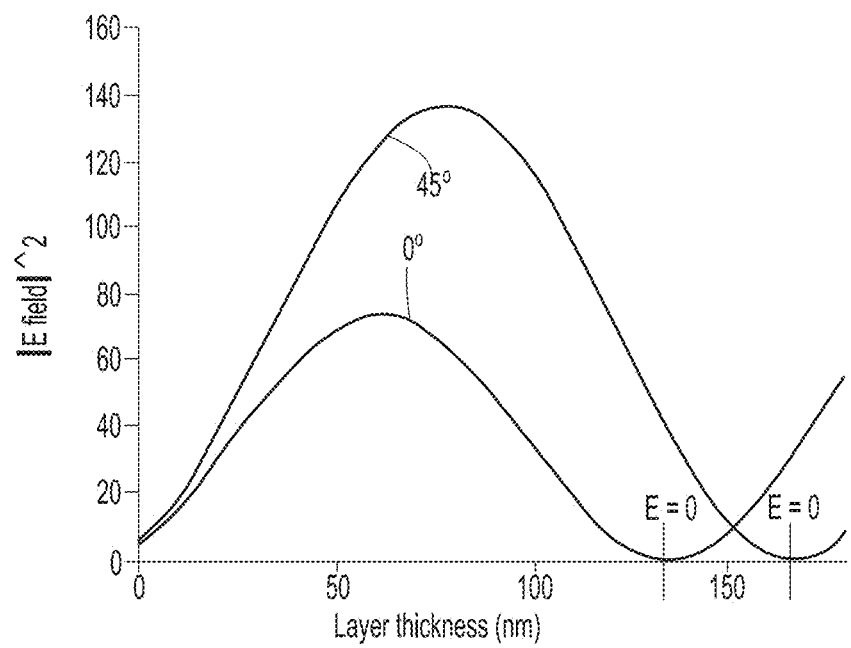
FIG. 6A is a graphical illustration of electric field squared versus dielectric layer thickness showing the electric field angular dependence of a Cr absorber layer for exposure to incident light at 0 and 45 degrees.

It is appreciated that the relatively large shift in $\lambda_c$ for the red color compared to the blue color is due to the dark red color hue space being very narrow and the fact that the Cr absorber layer absorbs wavelengths associated with a non-zero electric field, i.e. does not absorb light when the electric field is zero or near-zero. As such, FIG. 6A illustrates that the zero or non-zero point is different for light wavelengths at different incident angles. Such factors result in the angular dependent absorbance shown in FIG. 6B, i.e. the difference in the 0° and 45° absorbance curves. Thus in order to further refine the multilayer stack design and angular independence performance, an absorber layer that absorbs, e.g. blue light, irrespective of whether or not the electric field is zero or not, is used.

Figure 6B:
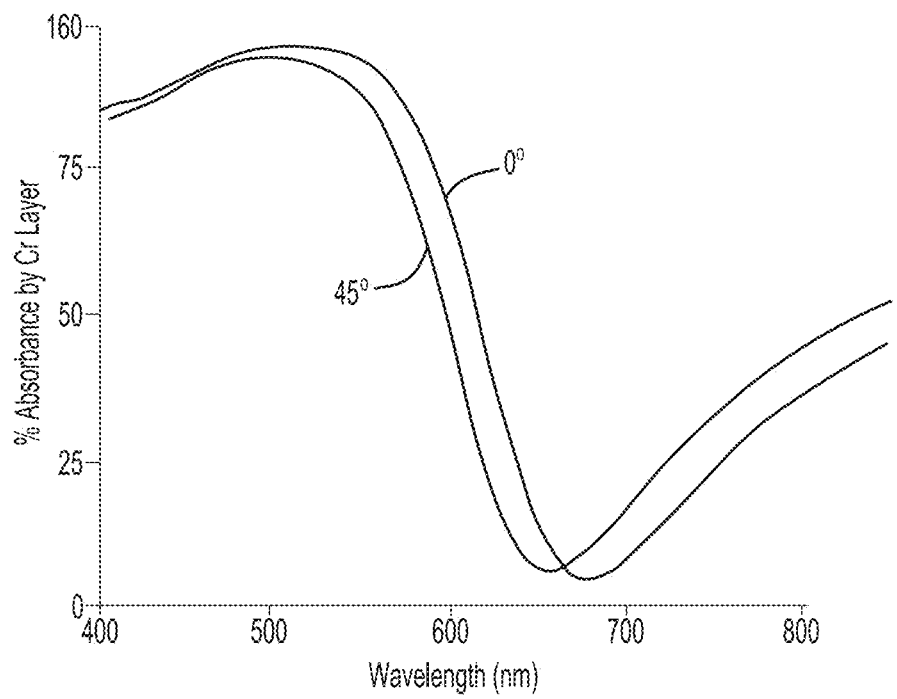
FIG. 6B is a graphical illustration of percent absorbance by a Cr absorber layer versus reflected EMR wavelength when exposed to white light at 0 and 45° angles relative to normal of the outer surface (0° being normal to surface)
Figure 7A:
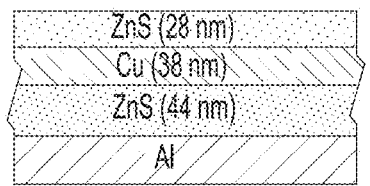
FIG. 7A is a schematic illustration of a red omnidirectional structural color multilayer stack according to an embodiment disclosed herein.
Figure 7B:
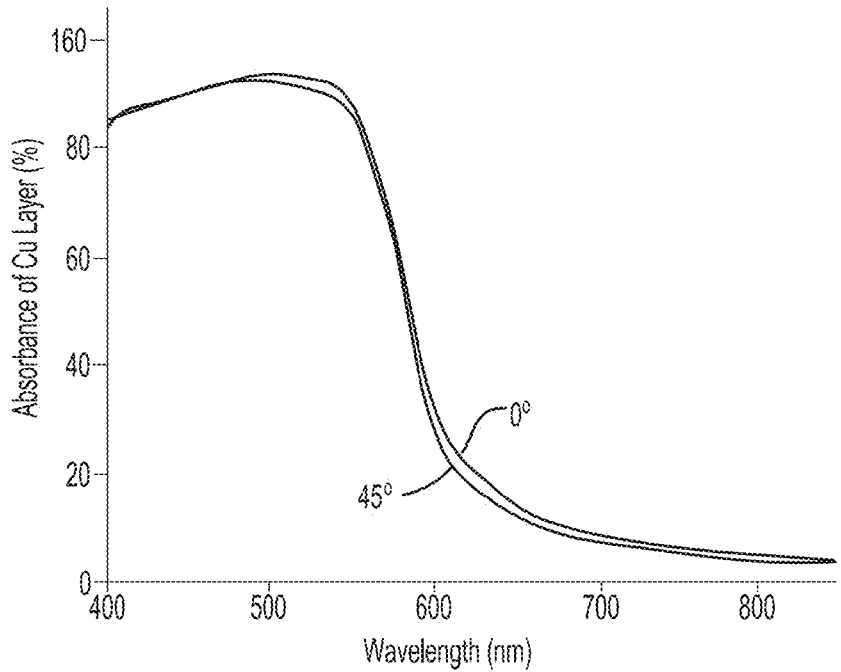
FIG. 7B is a graphical illustration of percent absorbance of the Cu absorber layer shown in FIG. 7A versus reflected EMR wavelength for white light exposure to the multilayer stack shown in FIG. 7A at incident angles of 0 and 45°.

In particular, FIG. 7A shows a multilayer stack with a Cu absorber layer instead of a Cr absorber layer extending across a dielectric ZnS layer. The results of using such a "colorful" or "selective" absorber layer is shown in FIG. 7B which demonstrates a much "tighter" grouping of the 0° and 45° absorbance lines for the multilayer stack shown in FIG. 7A. As such, a comparison between FIG. 6B and FIG. 7B illustrates the significant improvement in absorbance angular independence when using a selective absorber layer rather than non-selective absorber layer.

Figure 8:
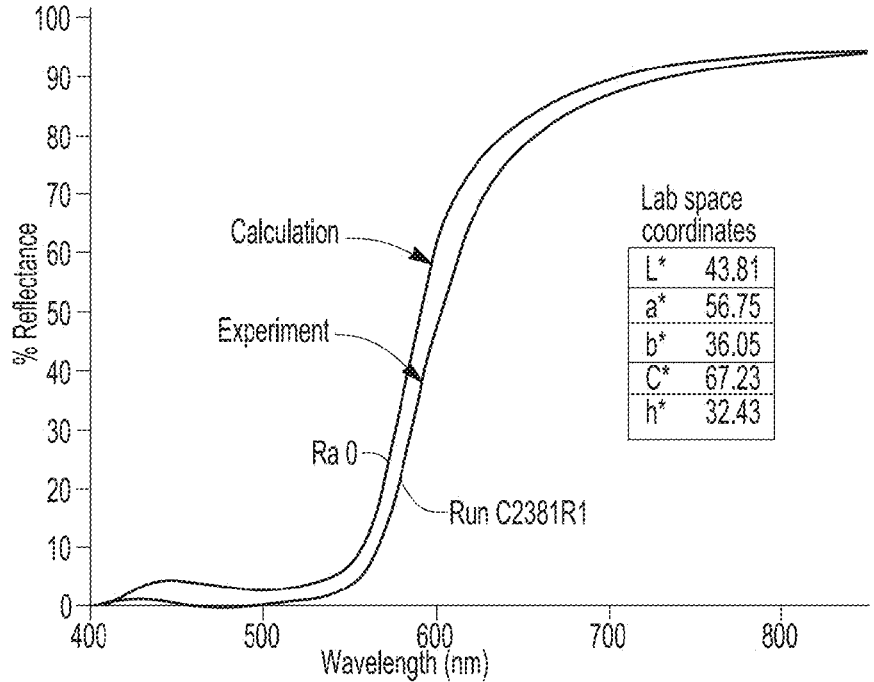
FIG. 8 is a graphical comparison between calculation/simulation data and experimental data for percent reflectance versus reflected EMR wavelength for a proof of concept red omnidirectional structural color multilayer stack exposed to white light at an incident angle of 0°.

Based on the above, a proof of concept multilayer stack structure was designed and manufactured. In addition, calculation/simulation results and actual experimental data for the proof of concept sample were compared. In particular, and as shown by the graphical plot in FIG. 8, a sharp red color was produced (wavelengths greater than 700 nm are not typically seen by the human eye) and very good agreement was obtained between the calculation/simulation and experimental light data obtained from the actual sample. Stated differently, calculations/simulations can and/or are used to simulate the results of multilayer stack designs according to one or more embodiments of the present invention and/or prior art multilayer stacks.

A list of simulated and/or actually produced multilayer stack samples is provided in the Table 1 below. As shown in the table, the inventive designs disclosed herein include at least 5 different layered structures. In addition, the samples were simulated and/or made from a wide range of materials. Samples that exhibited high chroma, low hue shift and excellent reflectance were provided. Also, the three and five layer samples had an overall thickness between 120-200 nm; the seven layer samples had an overall thickness between 350-600 nm; the nine layer samples had an overall thickness between 440-500 nm; and the eleven layer samples had an overall thickness between 600-660 nm.

TABLE 1

|  | Ave. Chroma (0-45) | Δh (0-65) | Max. Reflectance | Sample Name |
|---|---|---|---|---|
| 3 layer | 90 | 2 | 96 | 3-1 |
| 5 layer | 91 | 3 | 96 | 5-1 |
| 7 layer | 88 | 1 | 92 | 7-1 |
|  | 91 | 3 | 92 | 7-2 |
|  | 91 | 3 | 96 | 7-3 |
|  | 90 | 1 | 94 | 7-4 |
|  | 82 | 4 | 75 | 7-5 |
|  | 76 | 20 | 84 | 7-6 |
| 9 layer | 71 | 21 | 88 | 9-1 |
|  | 95 | 0 | 94 | 9-2 |
|  | 79 | 14 | 86 | 9-3 |
|  | 90 | 4 | 87 | 9-4 |
|  | 94 | 1 | 94 | 9-5 |
|  | 94 | 1 | 94 | 9-6 |
|  | 73 | 7 | 87 | 9-7 |
| 11 layer | 88 | 1 | 84 | 11-1 |
|  | 92 | 1 | 93 | 11-2 |
|  | 90 | 3 | 92 | 11-3 |
|  | 89 | 9 | 90 | 11-4 |

Figure 9:
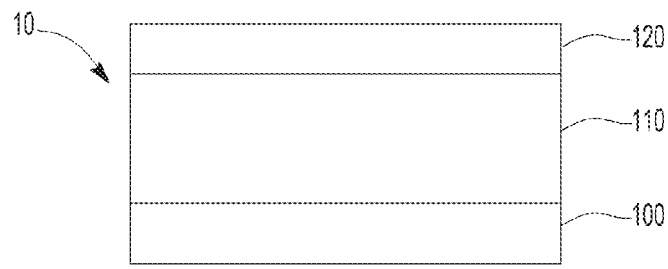
FIG. 9 is a schematic illustration of an omnidirectional structural color multilayer stack according to an embodiment disclosed herein.

Regarding the actual sequence of layers, FIG. 9 illustrates half of a five-layer design at reference numeral 10. The omnidirectional reflector 10 has a reflector layer 100, a dielectric layer 110 extending across the reflector layer 100 and an absorber layer 120 extending across the dielectric layer 110. It is appreciated that another dielectric layer and another absorber layer can be oppositely disposed the reflector layer 100 to provide the five-layer design.

Figure 10:
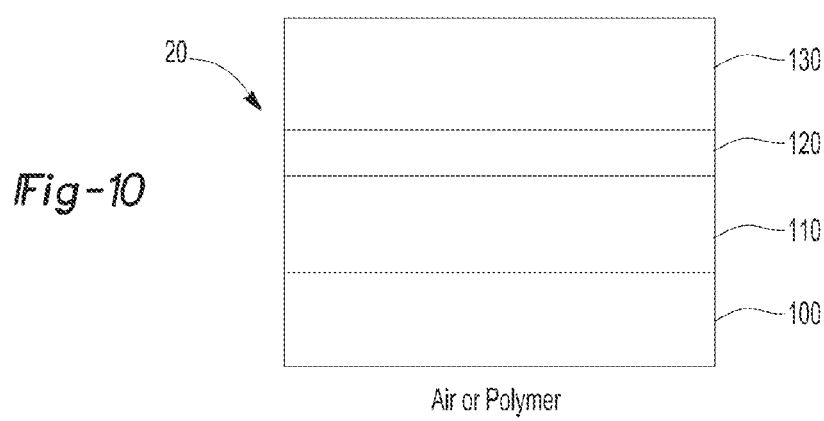
FIG. 10 is a schematic illustration of an omnidirectional structural color multilayer stack according to an embodiment disclosed herein.

Reference numeral 20 in FIG. 10 illustrates half of a seven-layer design in which another dielectric layer 130 extends across the absorber layer 120 such that the dielectric layer 130 is oppositely disposed from the dielectric layer 110 about the absorber layer 120.

Figure 11:
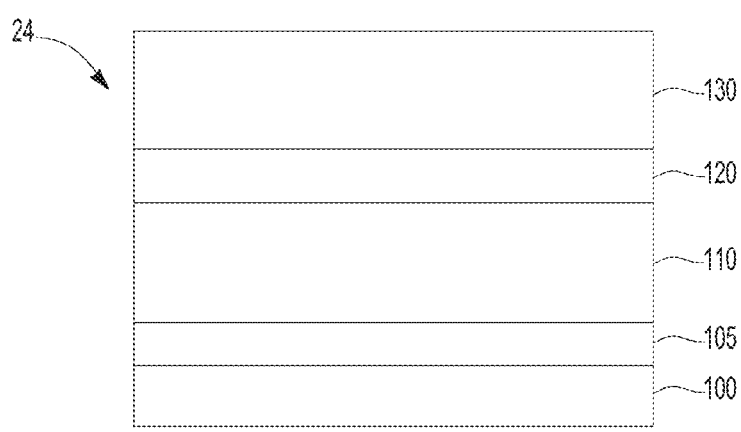
FIG. 11 is a schematic illustration of an omnidirectional structural color multilayer stack according to an embodiment disclosed herein.
Figure 12:
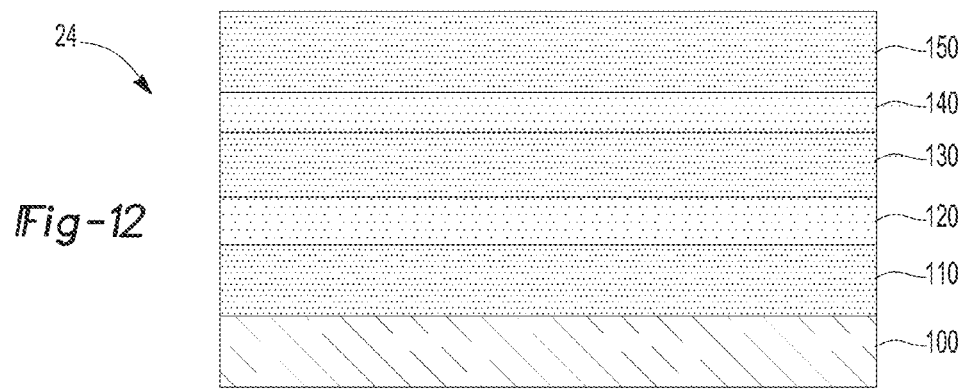
FIG. 12 is a schematic illustration of an omnidirectional structural color multilayer stack according to an embodiment disclosed herein.

FIG. 11 illustrates half of a nine-layer design in which a second absorber layer 105 is located between the reflector layer 100 and the dielectric layer 110. Finally, FIG. 12 illustrates half of an eleven-layer design in which another absorber layer 140 extends over the dielectric layer 130 and yet another dielectric layer 150 extends over the absorber layer 140.

Figure 13:
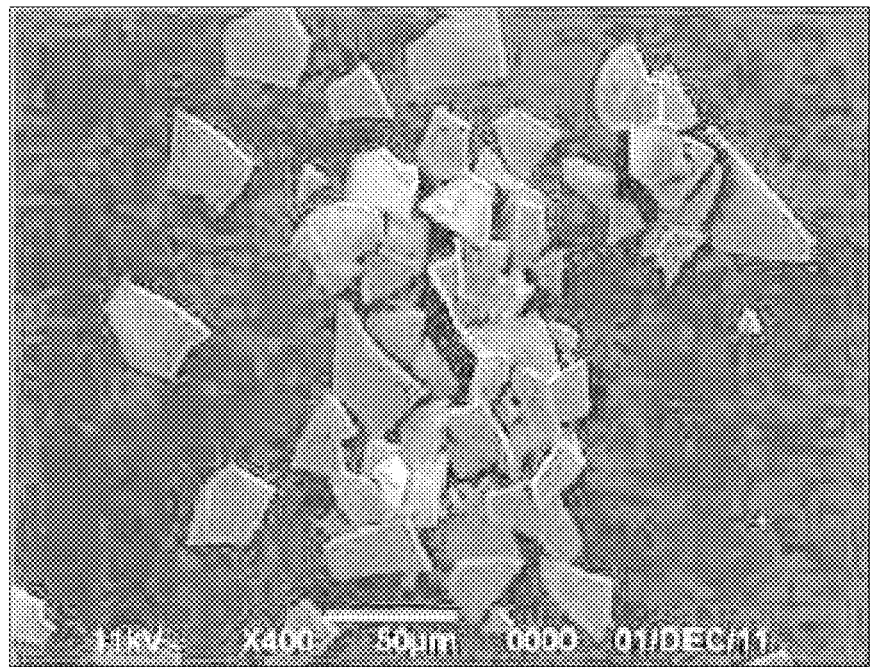
FIG. 13 is a scanning electron microscopy (SEM) image of flakes or pigments having a multilayer stack structure according to an embodiment disclosed herein.
Figure 14:
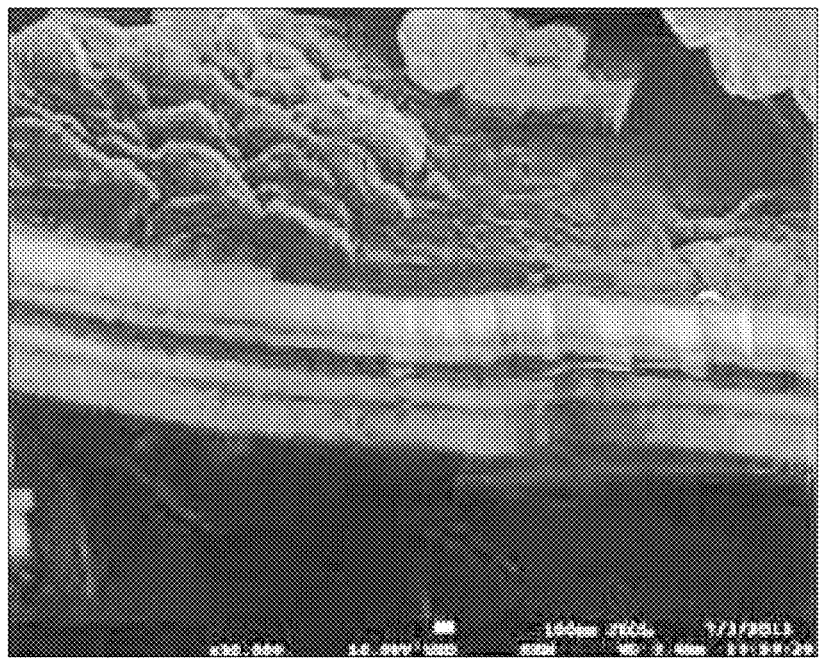
FIG. 14 is an SEM image of a cross section of an individual flake shown in FIG. 13.
Figure 15A:
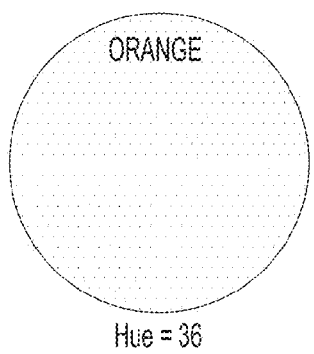
FIG. 15A is a schematic illustration of a panel painted using pigments designed and manufactured according to an embodiment of the present invention and having an orange color with a hue of 36° on the color map shown in FIG. 15D.
Figure 15B:
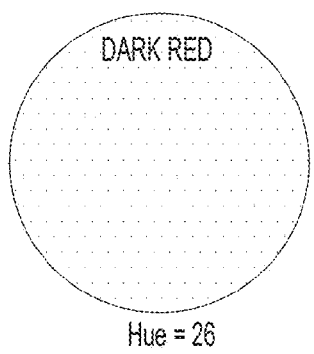
FIG. 15B is a schematic illustration of a panel painted using pigments designed and manufactured according to an embodiment of the present invention and having a dark red color with a hue of 26° on the color map shown in FIG. 15D.
Figure 15C:
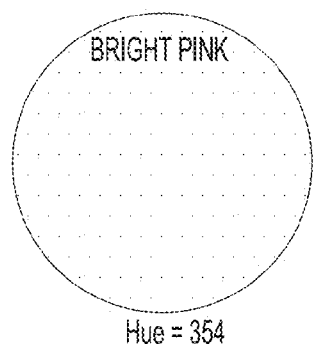
FIG. 15C is a schematic illustration of a panel painted using pigments designed and manufactured according to an embodiment of the present invention and having a bright pink color with a hue of 354° on the color map shown in FIG. 15D.

A scanning electron microscopy (SEM) image of a plurality of pigments having a multilayer structure according to an embodiment of the present invention is shown in FIG. 13. FIG. 14 is an SEM image of one of the pigments at a higher magnification showing the multilayer structure. Such pigments were used to produce three different red paints that were then applied to three panels for testing. FIGS. 15A-15C are schematic illustrations of the actual painted panels since actual photographs of the panels appear gray/black when printed and copied and in back and white. FIG. 15A represents an orange color with a hue of 36°, FIG. 15B represents a dark red color with a hue of 26° and FIG. 15C represents a bright pink color with a hue of 354° on the color map shown in FIG. 15D. Also, the dark red color panel represented in FIG. 15B, had a lightness L* of 44 and a chroma C* of 67.

Figure 15D:
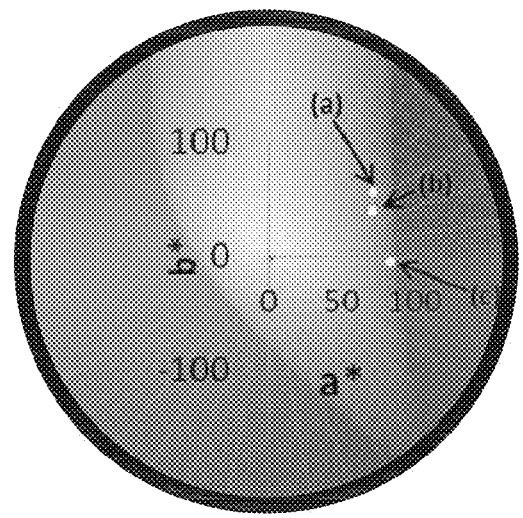
FIG. 15 D is an a*b* color map using the CIELAB color space.
FIG. 15E is a schematic illustration of an eleven-layer design used for the pigments in the paint represented in FIGS. 15A-15C.
Figure 15E:
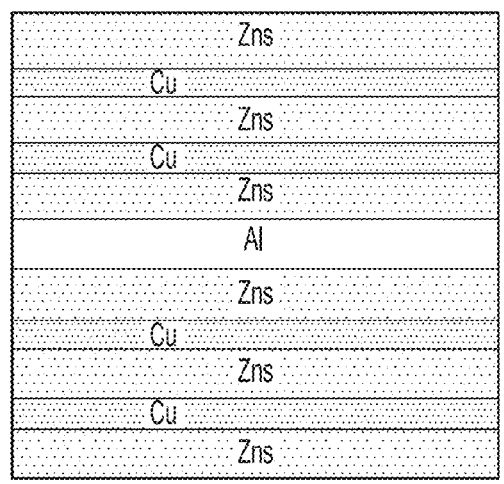

FIG. 15E is a schematic illustration of an eleven-layer design that represents the pigments used to paint the panels illustrated in FIGS. 15A-15C. Regarding exemplary thicknesses of the various layers, Table 2 provides the actual thicknesses for each of the corresponding multilayer stack/pigments. As shown by the thickness values in Table 2, the overall thickness of the eleven-layer design is less than 2 microns and can be less than 1 micron.

TABLE 2

|  | Color | | |
|---|---|---|---|
|  | Orange | Dark Red | Bright Pink |
| Layer | Layer Thickness (nm) | Layer Thickness (nm) | Layer Thickness (nm) |
| ZnS | 28 | 31 | 23 |
| Cu | 25 | 28 | 28 |
| ZnS | 141 | 159 | 40 |
| Cu | 32 | 36 | 72 |
| ZnS | 55 | 63 | 41 |
| Al | 80 | 80 | 80 |
| ZnS | 55 | 63 | 41 |
| Cu | 32 | 36 | 72 |
| ZnS | 141 | 159 | 40 |
| Cu | 25 | 28 | 28 |
| ZnS | 28 | 31 | 23 |

Figure 16A:
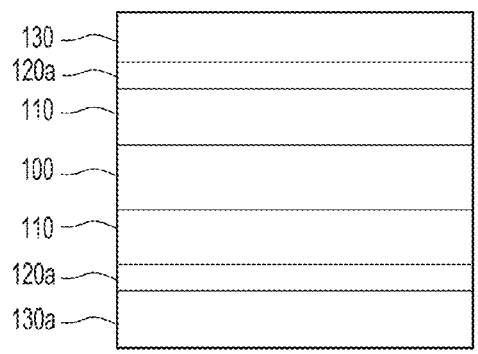
FIG. 16A is a schematic illustration of a seven-layer stack according to an embodiment disclosed herein.

It is appreciated that seven-layer designs and seven-layer multilayer stacks can be used to produce such pigments. Examples of a four seven-layer multilayer stacks are shown in FIGS. 16A-16D. FIG. 16A illustrates a seven-layer stack which has: (1) reflector layer 100; (2) a pair of dielectric layers 110 extending across and oppositely disposed about reflector layer 100; (3) a pair of selective absorber layers 120a extending across an outer surface of the pair of dielectric layers 110; and (4) a pair of dielectric layers 130 extending across an outer surface of the pair of selective absorber layers 120a.

Naturally, the thickness of the dielectric layer 110 and selective absorber layer 120a is such that the interface between selective absorber layer 120a and dielectric layer 110 and the interface between the selective absorber selective absorber 120a and dielectric layer 130 exhibit a zero or near-zero electric field with respect to a desired light wavelength in the pink-red-orange region (315°<hue<45° and/or 550 nm<$\lambda_c$<700 nm) of the color map shown in FIG. 15D. In this manner, a desired red colored light passes through layers 130-120a-110, reflects off of layer 100, and passes back through layers 110-120a-130. In contrast, non-red colored light is absorbed by the selective absorber layer 120a. Furthermore, the selective absorber layer 120a has an angle independent absorbance for non-red colored light as discussed above and shown in FIGS. 7A-7B.

It is appreciated that the thickness of the dielectric layer 100 and/or 130 is such that the reflectance of red colored light by the multilayer stack is omnidirectional. The omnidirectional reflection is measured or determined by a small $\Delta\lambda_c$ of the reflected light. For example, in some instances, $\Delta\lambda_c$ is less than 120 nm. In other instances, $\Delta\lambda_c$ is less than 100 nm. In still other instances, $\Delta\lambda_c$ is less than 80 nm, preferably less than 60 nm, still more preferably less than 50 nm, and even still yet more preferably less than 40 nm.

Figure 17:
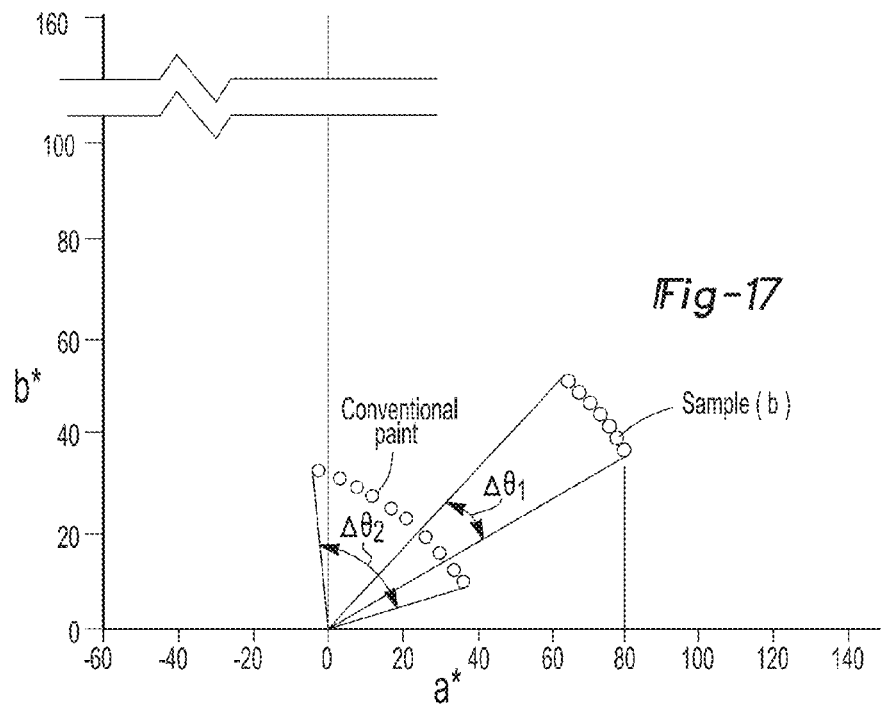
FIG. 17 is a graphical representation of a portion of an a*b* color map using the CIELAB color space in which the chroma and hue shift are compared between a conventional paint and the paint used to paint the panel illustrated in FIG. 15B.

The omnidirectional reflection can also be measured by a low hue shift. For example, the hue shift of pigments manufactured from multilayer stacks according an embodiment of the present invention is 30° or less, as shown in FIG. 17 (see $\Delta\theta_1$), and in some instances the hue shift is 25° or less, preferably less than 20°, more preferably less than 15° and still more preferably less than 10°. In contrast, traditional pigments exhibit hue shift of 45° or more (see $\Delta\theta_2$).

Figure 16B:
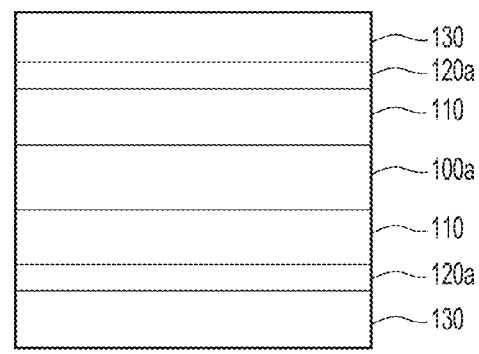
FIG. 16B is a schematic illustration of a seven-layer stack according to an embodiment disclosed herein.

FIG. 16B illustrates a seven-layer stack which has: (1) a selective reflector layer 100a; (2) a pair of dielectric layers 110 extending across and oppositely disposed about reflector layer 100a; (3) a pair of selective absorber layers 120a extending across an outer surface of the pair of dielectric layers 110; and (4) a pair of dielectric layers 130 extending across an outer surface of the pair of selective absorber layers 120a.

Figure 16C:
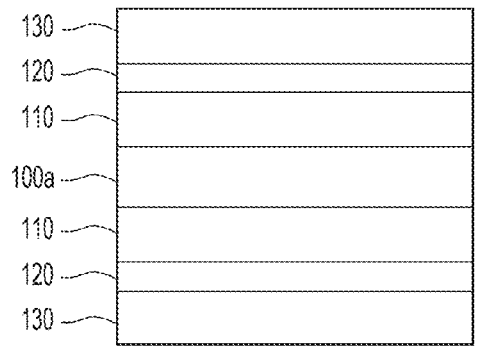
FIG. 16C is a schematic illustration of a seven-layer stack according to an embodiment disclosed herein.

FIG. 16C illustrates a seven-layer stack which has: (1) a selective reflector layer 100a; (2) a pair of dielectric layers 110 extending across and oppositely disposed about reflector layer 100a; (3) a pair of non-selective absorber layers 120 extending across an outer surface of the pair of dielectric layers 110; and (4) a pair of dielectric layers 130 extending across an outer surface of the pair of absorber layers 120.

Figure 16D:
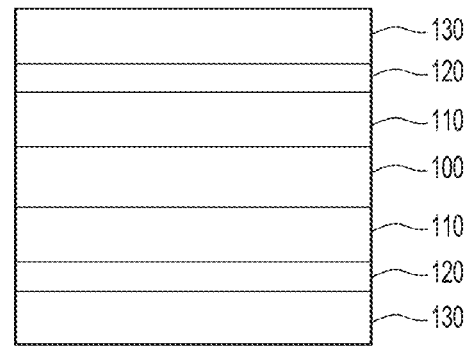
FIG. 16D is a schematic illustration of a seven-layer stack according to an embodiment disclosed herein.

FIG. 16D illustrates a seven-layer stack which has: (1) a reflector layer 100; (2) a pair of dielectric layers 110 extending across and oppositely disposed about reflector layer 100; (3) a pair of absorber layers 120 extending across an outer surface of the pair of dielectric layers 110; and (4) a pair of dielectric layers 130 extending across an outer surface of the pair of selective absorber layers 120.

Figure 18:
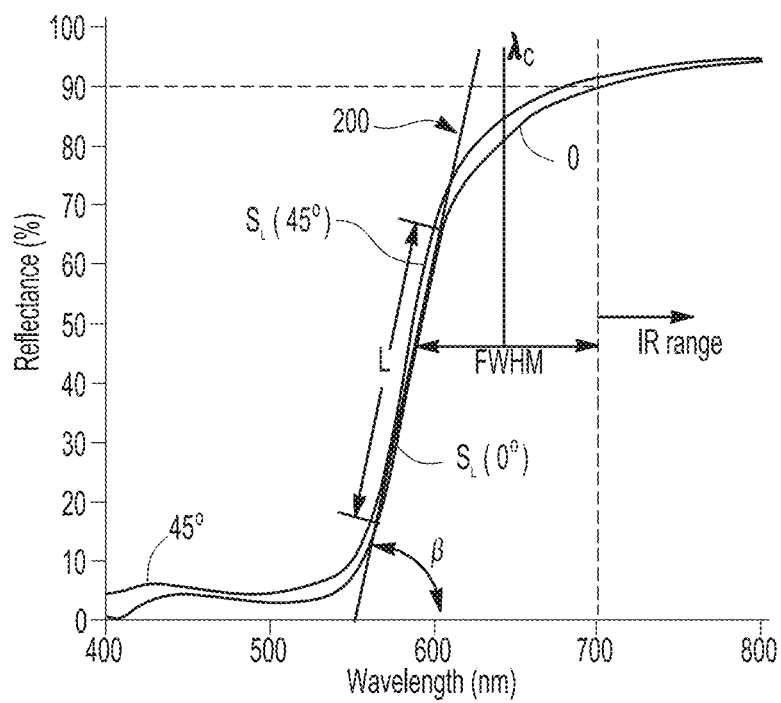
FIG. 18 is a graphical illustration of reflectance versus wave length for a seven-layer design according to an embodiment disclosed herein.

Turning now to FIG. 18, a plot of percent reflectance versus reflected EMR wavelength is shown for a seven-layer design omnidirectional reflector when exposed to white light at angles of 0 and 45° relative to the surface of the reflector. As shown by the plot, both the 0° and 45° curves illustrate very low reflectance, e.g. less than 10%, provided by the omnidirectional reflector for wavelengths less than 550 nm. However, the reflector, as shown by the curves, provides a sharp increase in reflectance at wavelengths between 560-570 nm and reaches a maximum of approximately 90% at 700 nm. It is appreciated that the portion or region of the graph on the right hand side (IR side) of the curve represents the IR-portion of the reflection band and a single narrow band of visible electromagnetic radiation with a center wavelength between 550-700 nm is provided by the reflector.

The sharp increase in reflectance provided by the omnidirectional reflector is characterized by a UV-sided edge of each curve that extends from a low reflectance portion at wavelengths below 550 nm up to a high reflectance portion, e.g. >70%. A linear portion 200 of the UV-sided edge is inclined at an angle (β) greater than 60° relative to the x-axis, has a length L of approximately 40 on the Reflectance-axis and a slope of 1.4. In some instances, the linear portion is inclined at an angle greater than 70° relative to the x-axis, while in other instances β is greater than 75°. Also, the reflection band has a visible FWHM of less than 200 nm, and in some instances a visible FWHM of less than 150 nm, and in other instances a visible FWHM of less than 100 nm. In addition, the center wavelength $\lambda_c$ for the visible reflection band as illustrated in FIG. 18 is defined as the wavelength that is equal-distance between the UV-sided edge of the reflection band and the IR edge of the IR spectrum at the visible FWHM.

It is appreciated that the term "visible FWHM" refers to the width of the reflection band between the UV-sided edge of the curve and the edge of the IR spectrum range, beyond which reflectance provided by the omnidirectional reflector is not visible to the human eye. In this manner, the inventive designs and multilayer stacks disclosed herein use the non-visible IR portion of the electromagnetic radiation spectrum to provide a sharp or structural color. Stated differently, the omnidirectional reflectors disclosed herein take advantage of the non-visible IR portion of the electromagnetic radiation spectrum in order to provide a narrow band of reflected visible light, despite the fact that the reflectors may reflect a much broader band of electromagnetic radiation that extends into the IR region.

Figure 19:
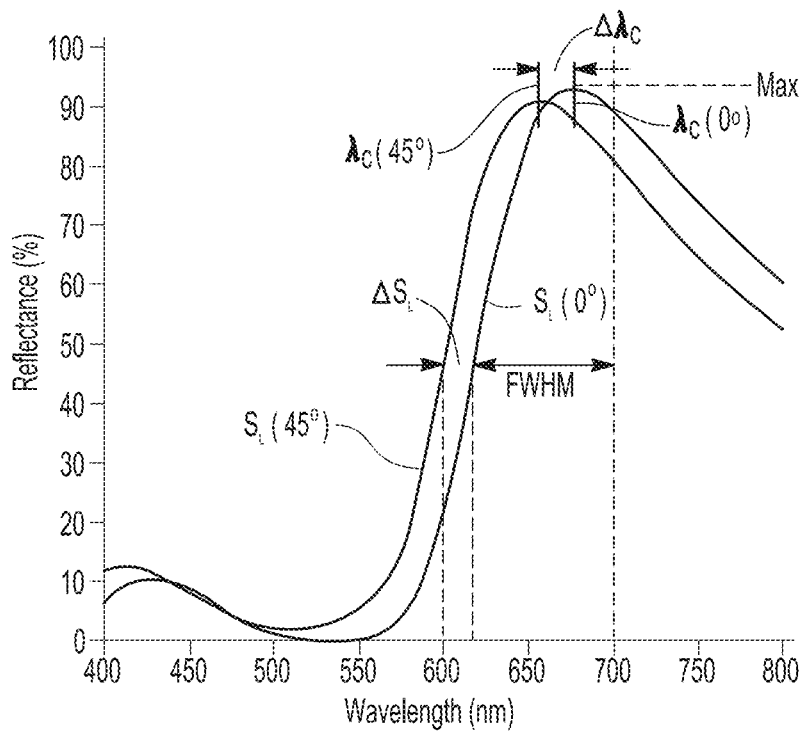
FIG. 19 is a graphical illustration of reflectance versus wave length for a seven-layer design according to an embodiment disclosed herein.

Referring now to FIG. 19, a plot of percent reflectance versus wavelength is shown for another seven-layer design omnidirectional reflector when exposed to white light at angles of 0 and 45° relative to the surface of the reflector. In addition, a definition or characterization of omnidirectional properties provided by omnidirectional reflectors disclosed herein is shown. In particular, and when the reflection band provided by an inventive reflector has a maximum, i.e. a peak, as shown in the figure, each curve has a center wavelength ($\lambda_c$) defined as the wavelength that exhibits or experiences maximum reflectance. The term maximum reflected wavelength can also be used for $\lambda_c$.

As shown in FIG. 19, there is shift or displacement of $\lambda_c$ when an outer surface of the omnidirectional reflector is observed from an angle 45° ($\lambda_c(45°)$), e.g. the outer surface is tiled 45° relative to a human eye looking at the surface, compared to when the surface is observed from an angle of 0° (($\lambda_c(0°)$), i.e. normal to the surface. This shift of $\lambda_c$ ($\Delta\lambda_c$) provides a measure of the omnidirectional property of the omnidirectional reflector. Naturally a zero shift, i.e. no shift at all, would be a perfectly omnidirectional reflector. However, omnidirectional reflectors disclosed herein can provide a $\Delta\lambda_c$ of less than 100 nm, which to the human eye can appear as though the surface of the reflector has not changed color and thus from a practical perspective the reflector is omnidirectional. In some instances, omnidirectional reflectors disclosed herein can provide a $\Delta\lambda_c$ of less than 75 nm, in other instances a $\Delta\lambda_c$ of less than 50 nm, and in still other instances a $\Delta\lambda_c$ of less than 25 nm, while in still yet other instances a $\Delta\lambda_c$ of less than 15 nm. Such a shift in $\Delta\lambda_c$ can be determined by an actual reflectance versus wavelength plot for a reflector, and/or in the alternative, by modeling of the reflector if the materials and layer thicknesses are known.

Another definition or characterization of a reflector's omnidirectional properties can be determined by the shift of a side edge for a given set of angle refection bands. For example, a shift or displacement of a UV-sided edge ($\Delta S_L$) for reflectance from an omnidirectional reflector observed from 0° ($S_L(0°)$) compared to the UV-sided edge for reflectance by the same reflector observed from 45° ($S_L(45°)$) provides a measure of the omnidirectional property of the omnidirectional reflector. In addition, using $\Delta S_L$ as a measure of omnidirectionality can be preferred to the use of $\Delta\lambda_c$, e.g. for reflectors that provide a reflectance band similar to the one shown in FIG. 18, i.e. a reflection band with a peak corresponding to a maximum reflected wavelength that is not in the visible range (see FIG. 18). It is appreciated that the shift of the UV-sided edge ($\Delta S_L$) is and/or can be measured at the visible FWHM.

Naturally a zero shift, i.e. no shift at all ($\Delta S_L=0$ nm), would characterize a perfectly omnidirectional reflector. However, omnidirectional reflectors disclosed herein can provide a $\Delta S_L$ of less than 100 nm, which to the human eye can appear as though the surface of the reflector has not changed color and thus from a practical perspective the reflector is omnidirectional. In some instances, omnidirectional reflectors disclosed herein can provide a $\Delta S_L$ of less than 75 nm, in other instances a $\Delta S_L$ of less than 50 nm, and in still other instances a $\Delta S_L$ of less than 25 nm, while in still yet other instances a $\Delta S_L$ of less than 15 nm Such a shift in $\Delta S_L$ can be determined by an actual reflectance versus wavelength plot for a reflector, and/or in the alternative, by modeling of the reflector if the materials and layer thicknesses are known.

Figure 20:
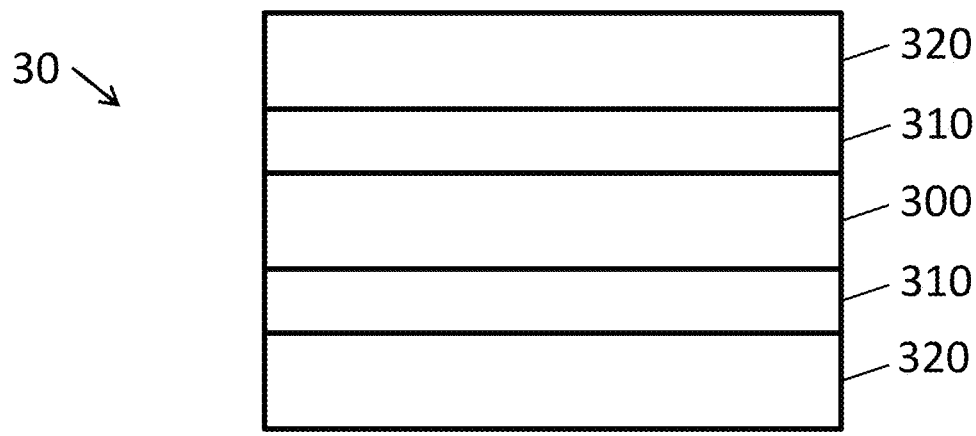
FIG. 20 is a schematic illustration of a five-layer stack according to another embodiment disclosed herein.

Turning now to FIG. 20, a five-layer design according to another embodiment is schematically shown at reference numeral 30. The five layer stack has a core layer 300, a pair of semiconductor layers 310 extending across and oppositely disposed about the core layer 300 and a pair of dielectric layers 320 extending across an outer surface of the pair of semiconductor layers 310. The core layer has a thickness between 50-200 nm and can be a reflector core layer, an absorber/reflector core layer or a dielectric core layer. The reflector core layer is made from a reflector material such as Al, Ag, Pt, alloys thereof and the like. The absorber/reflector core layer is made from an absorber/reflector material such as Cr, Cu, Au, Sn, alloys thereof and the like. The dielectric core layer is made from a dielectric core material such as glass, mica and the like. In the alternative, the dielectric core material can be a colorful dielectric material such as $Fe_2O_3$, $Cu_2O$ and the like.

The semiconductor layer 310 has a thickness between 5-400 nm and is made from any semiconductor material that has an electronic bandgap in the visible range of the electromagnetic wave spectrum such as Si, amorphous Si, Ge, combinations thereof and the like. In addition, the dielectric layer 320 has a thickness between 0.1 QW-4.0 QW and can be made from any dielectric material known to those skilled in the art having a refractive index greater than 1.6, illustratively including ZnS, $TiO_2$, $Si_2N_4$, $HfO_2$, $Nb_2O_5$, $Ta_2O_5$, combinations thereof, and the like.

Figure 21:
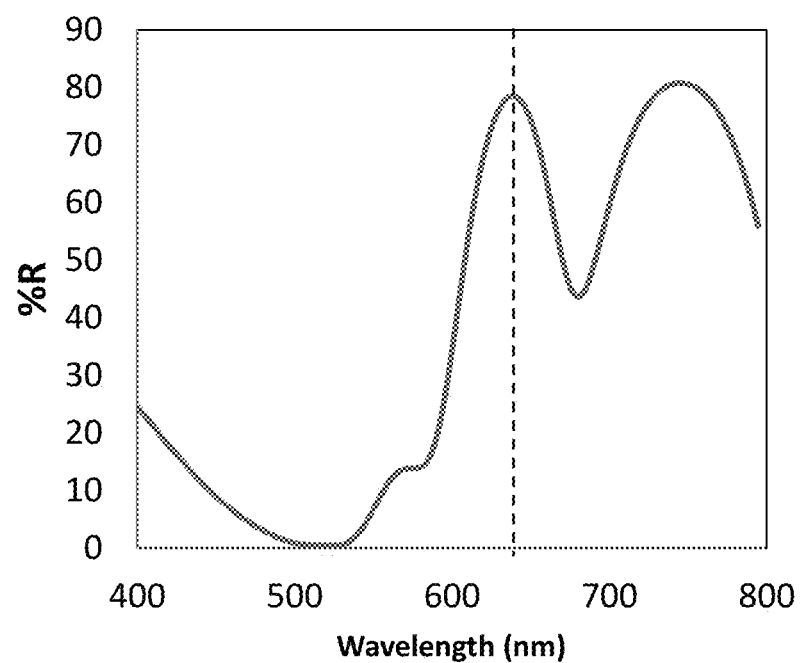
FIG. 21 is a graphical illustration of reflection versus wavelength for a two-layer design that produces a five-layer stack according to another embodiment disclosed herein.

The reflectance spectrum for such a five-layer design is shown in FIG. 21 where percent reflectance versus wavelength is shown for a multilayer stack having an amorphous Si semiconductor layer 310 and a $Si_3N_4$ dielectric layer 320 on a core layer 300. As shown in the figure, the multilayer stack reflects more than 70% of incident electromagnetic radiation having a wavelength of generally 640 nm, absorbs more than 70% of incident electromagnetic radiation with wavelengths generally less than 550 nm and provides a single narrow band of visible electromagnetic radiation with a center wavelength between 550-700 nm. Furthermore, and although not shown in the figure, the reflectance spectrum is shown for a viewing angle of 0°, i.e. normal to the surface, and when viewed at 45° the peak of the reflection band shifts less than 45 nm.

Figure 22:
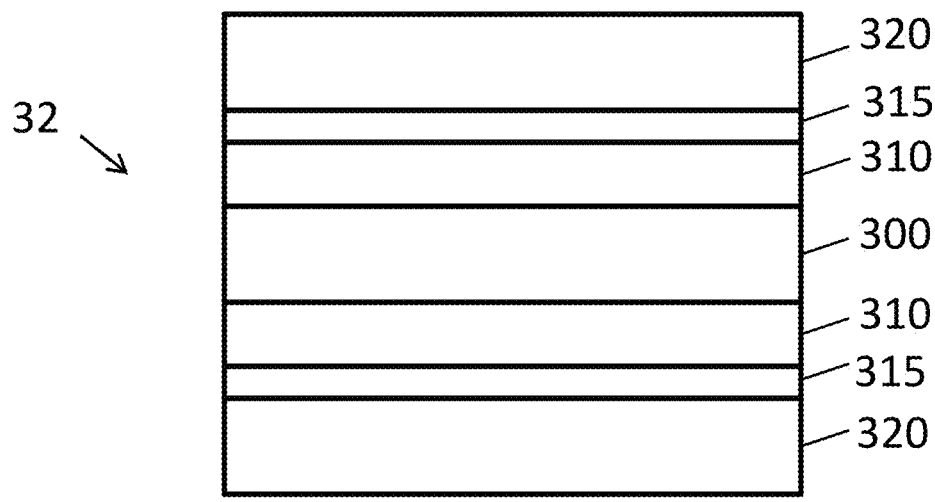
FIG. 22 is a schematic illustration of a seven-layer stack according to another embodiment disclosed herein.

Referring now to FIG. 22, a seven-layer design according to another embodiment is shown generally at reference numeral 32. The multilayer stack 32 is similar to the multilayer stack 30 shown in FIG. 20, however an optional partial absorber layer 315 is present between the semiconductor layer 310 and the dielectric layer 320. The partial absorber layer has a thickness between 2-30 nm and can be made from a partial absorber material such as Cr, Cu, Au, Sn, alloys thereof and the like.

Figure 23:
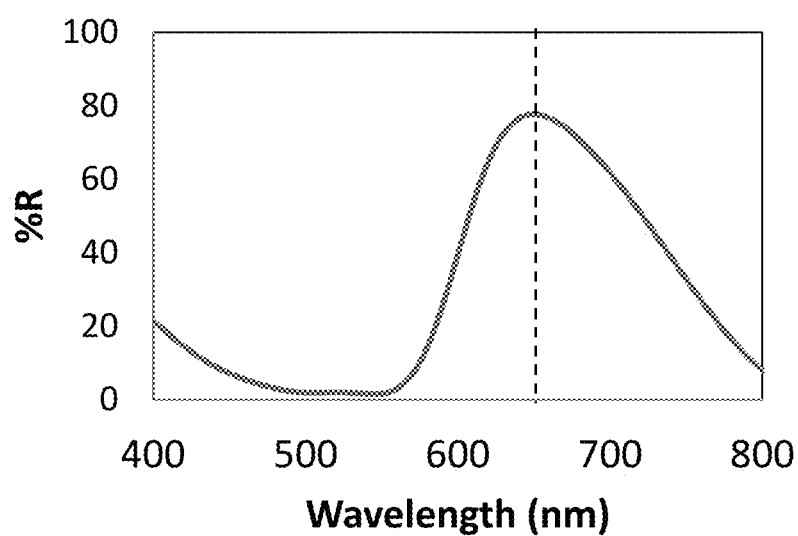
FIG. 23 is a graphical illustration of reflection versus wavelength for a three-layer design that produces a seven-layer stack according to another embodiment disclosed herein.

A reflectance spectrum of such a seven-layer stack having a core layer 300, a pair of amorphous Si semiconductor layers 310, a pair of Cr partial absorber layers 315 and a pair of $Si_3N_4$ dielectric layers 320 is shown in FIG. 23. As shown in the figure, the multilayer stack reflects more than 70% of incident electromagnetic radiation having a wavelength of generally 640 nm and absorbs more than 70% of incident electromagnetic radiation with wavelengths generally less than 550 nm. Furthermore, and although not shown in the figure, the reflectance spectrum is shown for a viewing angle of 0°, i.e. normal to the surface, and when viewed at 45° the peak of the reflection band shifts less than 45 nm.

Figure 24:
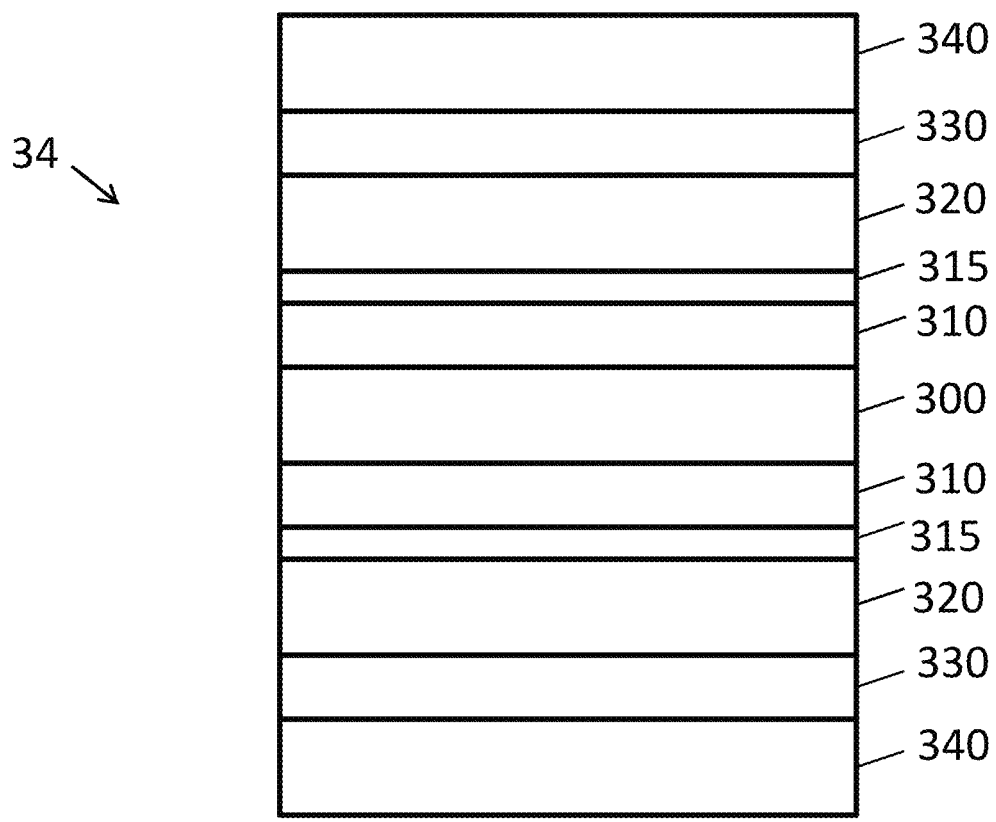
FIG. 24 is a schematic illustration of an eleven-layer stack according to another embodiment disclosed herein.

An eleven-layer design according to another embodiment is shown in FIG. 24 at reference numeral 34. In particular, the eleven-layer design is similar to the seven-layer design 32 shown in FIG. 22, except for the addition of a second pair of semiconductor layers 330 extending across the first dielectric layers 320 and a second pair of dielectric layers 340 extending across the second pair of semiconductor layers 330. It is appreciated that the eleven layer design 34 includes the optional partial absorber layer 315, however, this is not required.

Figure 25:
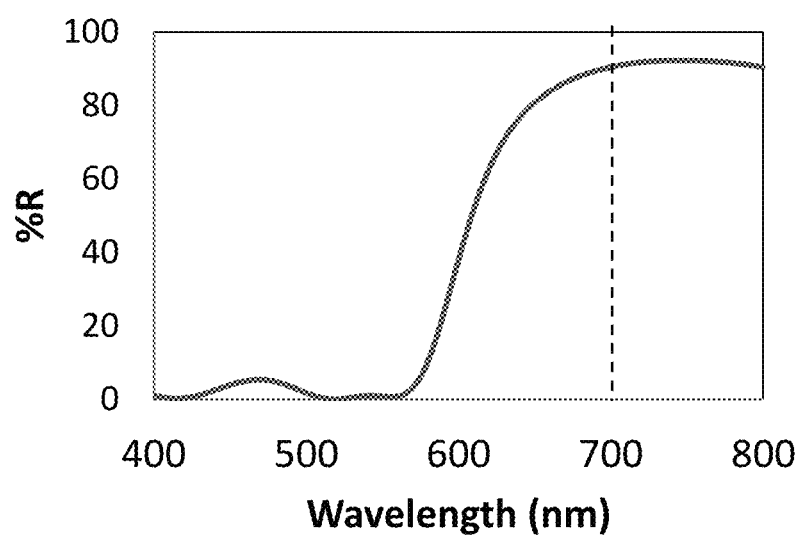
FIG. 25 is a graphical illustration of reflection versus wavelength for a five-layer design that produces an eleven-layer stack according to another embodiment disclosed herein.
Figure 26:
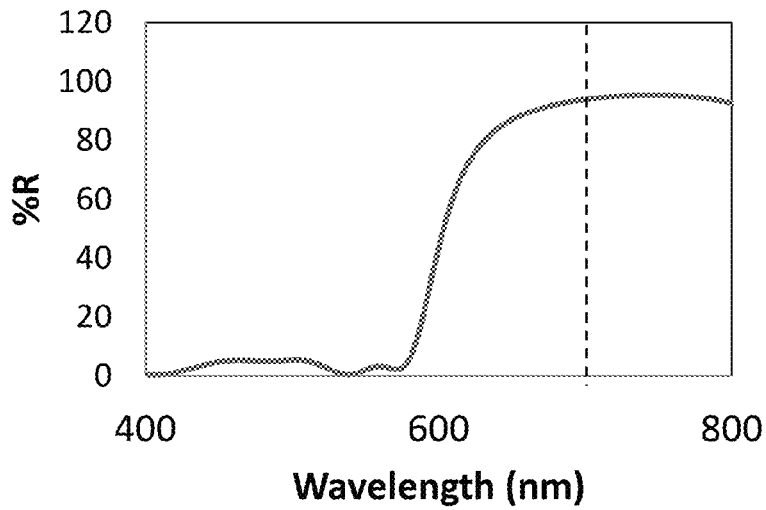
FIG. 26 is a graphical illustration of reflection versus wavelength for a six-layer design according to another embodiment disclosed herein.
Figure 27:
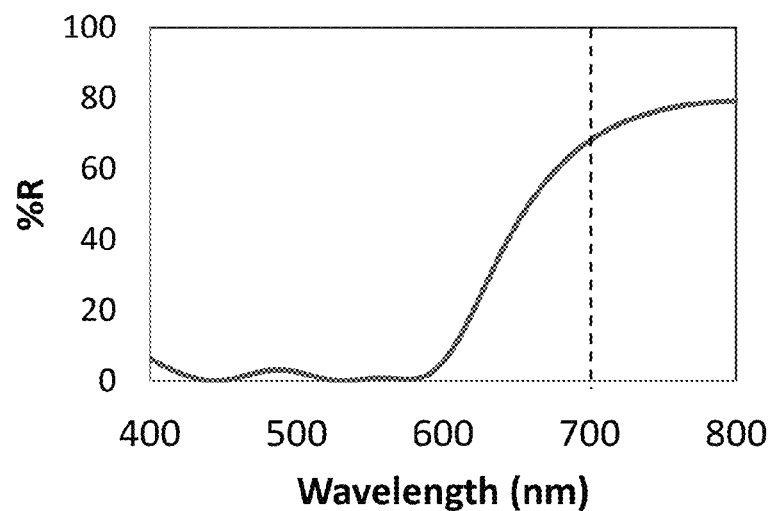
FIG. 27 is a graphical illustration of reflection versus wavelength for a four-layer design according to another embodiment disclosed herein.
Figure 28:
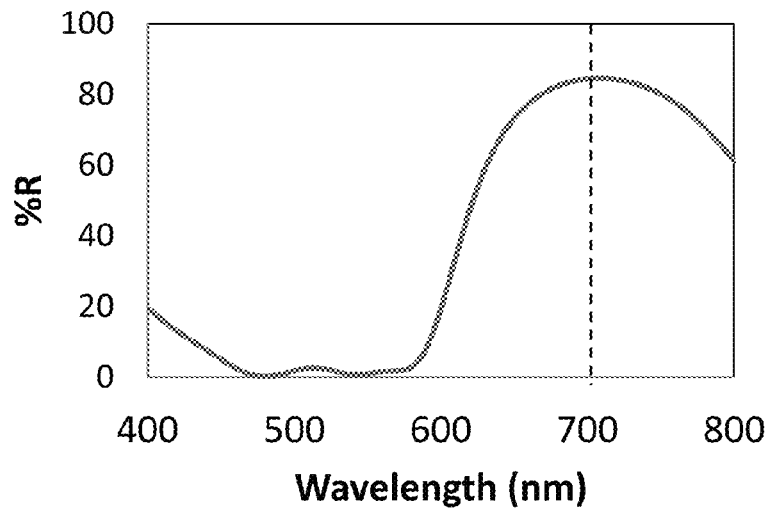
FIG. 28 is a graphical illustration of reflection versus wavelength for a five-layer design according to another embodiment disclosed herein.
Figure 29:
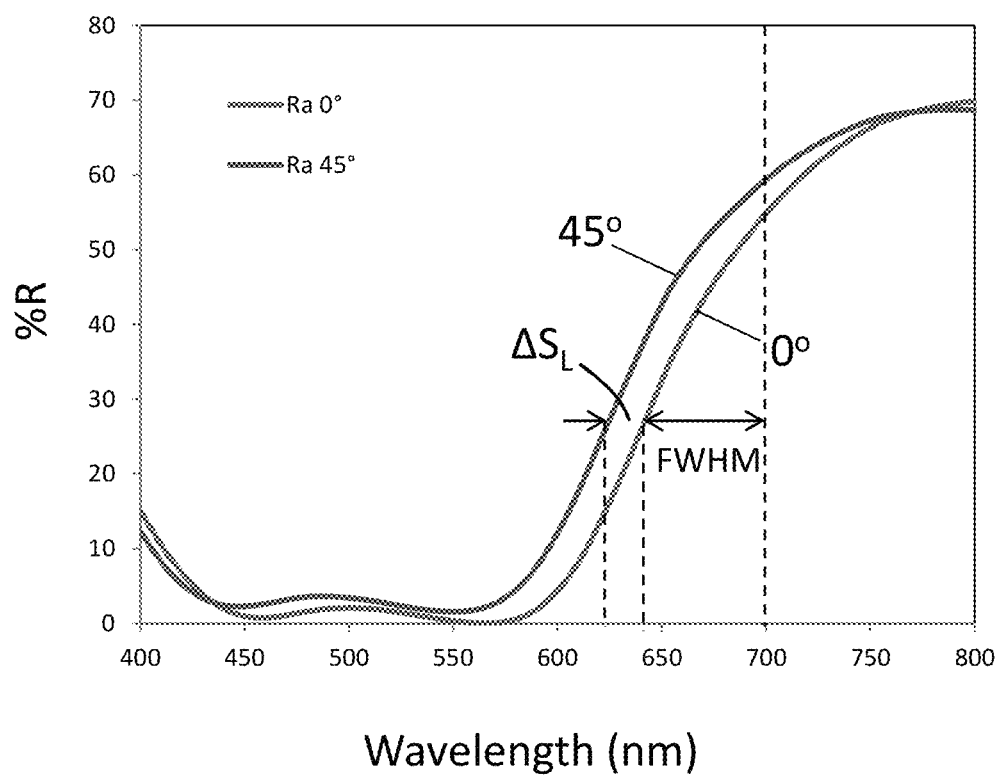
FIG. 29 is a graphical illustration of reflection versus wavelength for a four-layer design according to another embodiment disclosed herein.

A reflectance spectrum of such an eleven-layer stack having a core layer 300, a pair of first amorphous Si semiconductor layers 310, a pair of Cr partial absorber layers 315, a pair of first $Si_3N_4$ dielectric layers 320, a pair of second Si semiconductor layers 330 and a pair of second $Si_3N_4$ dielectric layers 320 is shown in FIG. 25. As shown in the figure, the multilayer stack reflects more than 70% of incident electromagnetic radiation having a wavelength of generally greater than 550 nm and absorbs more than 70% of incident electromagnetic radiation with wavelengths generally less than 550 nm. Furthermore, and although not shown in the figure, the reflectance spectrum is shown for a viewing angle of 0°, i.e. normal to the surface, and when viewed at 45° the peak of the reflection band shifts less than 45 nm FIG. 26 shows a reflectance spectrum for a thirteen-layer stack having a core layer 300, a pair of first amorphous Si semiconductor layers 310, a pair of first $Si_3N_4$ dielectric layers 320, a pair of second Si semiconductor layers 330, a pair of second $Si_3N_4$ dielectric layers 340, plus a pair of third Si semiconductor layers extending across outer surfaces of the pair of second $Si_3N_4$ dielectric layers 340 and a pair of third $Si_3N_4$ dielectric layer extending across outer surfaces of the pair of third Si semiconductor layers. As shown in the figure, the multilayer stack reflects more than 70% of incident electromagnetic radiation having a wavelength of generally greater than 550 nm and absorbs more than 70% of incident electromagnetic radiation with wavelengths generally less than 550 nm. Furthermore, and although not shown in the figure, the reflectance spectrum is shown for a viewing angle of 0°, i.e. normal to the surface, and when viewed at 45° the peak of the reflection band shifts less than 45 nm FIG. 27 shows a reflectance spectrum for a nine-layer design having a core layer 300, a pair of first amorphous Si semiconductor layers 310, a pair of first $Si_3N_4$ dielectric layers 320, a pair of second Si semiconductor layers 330 and a pair of second $Si_3N_4$ dielectric layers 340. As shown in the figure, the multilayer stack take advantage of the non-visible IR range of the electromagnetic spectrum, reflects more than 70% of incident electromagnetic radiation having a wavelength of generally greater than 550 nm and absorbs more than 70% of incident electromagnetic radiation with wavelengths generally less than 550 nm. Furthermore, and although not shown in the figure, the reflectance spectrum is shown for a viewing angle of 0°, i.e. normal to the surface, and when viewed at 45° the peak of the reflection band shifts less than 45 nm FIG. 28 shows a reflectance spectrum for an eleven-layer design having a core layer, a pair of first $Si_3N_4$ dielectric layers extending across the core layer, a pair of first Si semiconductor layers extending across outer surfaces of the pair of first $Si_3N_4$ dielectric layers, a pair of second $Si_3N_4$ dielectric layers extending across outer surfaces of the first Si semiconductor layers, a pair of second Si semiconductor layers extending across outer surfaces of the second $Si_3N_4$ dielectric layers and a pair of third $Si_3N_4$ dielectric layers extending across outer surface of the second Si semiconductor layers. As shown in the figure, the multilayer stack takes advantage of the non-visible IR range of the electromagnetic spectrum, reflects more than 70% of incident electromagnetic radiation having a wavelength of generally greater than 550 nm and absorbs more than 70% of incident electromagnetic radiation with wavelengths generally less than 550 nm. Furthermore, and although not shown in the figure, the reflectance spectrum is shown for a viewing angle of 0°, i.e. normal to the surface, and when viewed at 45° the peak of the reflection band shifts less than 45 nm FIG. 29 shows a reflectance spectrum for a nine-layer design having a Cr absorber/reflector layer 300, a pair of first amorphous Si semiconductor layers 310, a pair of first $TiO_2$ dielectric layers 320, a pair of second amorphous Si semiconductor layers 330 and a pair of second $TiO_2$ dielectric layers 340. Although the multilayer stack does not reflect more than 70% of incident electromagnetic radiation having a wavelength of generally greater than 550 nm, the design illustrates taking advantage of the non-visible IR range and absorbing more than 70% of incident electromagnetic radiation with wavelengths generally less than 550 nm. Furthermore, the figure illustrates how the inventive embodiments can have a shift in the UV-sided edge measured at the visible FWHM of less than 40 nm, e.g. less than 30 nm.

Methods for producing the multilayer stacks disclosed herein can be any method or process known to those skilled in the art or one or methods not yet known to those skilled in the art. Typical known methods include wet methods such as sol gel processing, layer-by-layer processing, spin coating and the like. Other known dry methods include chemical vapor deposition processing and physical vapor deposition processing such as sputtering, electron beam deposition and the like.

The multilayer stacks disclosed herein can be used for most any color application such as pigments for paints, thin films applied to surfaces and the like. For example, pigments are manufactured by depositing a desired multilayer onto a web having a sacrificial layer. Once the sacrificial layer is removed, the lifted off coating is ground into free standing flakes that have a maximum surface dimension of 20 μm and a thickness between 0.3-1.5 μm. The flakes are then mixed with polymeric materials such as binders, additives and a base coat resin to provide an omnidirectional structural color paint.

The above examples and embodiments are for illustrative purposes only and changes, modifications, and the like will be apparent to those skilled in the art and yet still fall within the scope of the invention. As such, the scope of the invention is defined by the claims and all equivalents thereof.

We claim:

1. A multilayer stack displaying a red omnidirectional structural color comprising:
   a core layer;
   a semiconductor layer extending across said core layer, said semiconductor layer absorbing more than 70% of incident white light with wavelengths less than 550 nm; and
   a dielectric layer extending across said semiconductor layer, said dielectric layer and said core layer reflecting more than 70% of said incident white light with wavelengths greater than 550 nm;
   said core layer, semiconductor layer and dielectric layer forming an omnidirectional reflector, said omnidirectional reflector reflecting a single narrow band of visible electromagnetic radiation with a center wavelength between 550-700 nm, a width of less than 200 nm wide, a color shift of less than 100 nm and displaying a red omnidirectional structural color when said omnidirectional reflector is viewed from angles between 0 and 45degrees.

2. The multilayer stack of claim 1, wherein said semiconductor layer has a thickness between 5-400 nm.

3. The multilayer stack of claim 2, wherein said semiconductor layer is made from a semiconductor material selected from the group consisting of Si, amorphous Si, Ge and or other semiconductor layer that has electronic bandgap in the visible range of the electromagnetic wave combinations thereof.

4. The multilayer stack of claim 3, wherein said dielectric layer has a thickness between 0.1 QW-4.0 QW.

5. The multilayer stack of claim 4, wherein said dielectric layer is made from a dielectric material having a refractive index greater than 1.6 and selected from the group consisting of ZnS, $TiO_2$, $Si_2N_4$, $HfO_2$, $Nb_2O_5$, $Ta_2O_5$ and combinations thereof.

6. The multilayer stack of claim 4, wherein said dielectric layer is a colorful dielectric layer made from a colorful dielectric material selected from the group consisting of $Fe_2O_3$, $Cu_2O$ and combinations thereof.

7. The multilayer stack of claim 6, further comprising a partial absorber layer extending between said semiconductor layer and said dielectric layer.

8. The multilayer stack of claim 7, wherein said partial absorber layer has a thickness between 2-30 nm.

9. The multilayer stack of claim 8, wherein said partial absorber layer is made from a partial absorber material selected from the group consisting of Cr, Cu, Au, Sn and alloys thereof.

10. The multilayer stack of claim 4, further comprising a second semiconductor layer in addition to said previous mentioned semiconductor layer, said second semiconductor layer extending across said dielectric layer and oppositely disposed said semiconductor layer about said dielectric layer;
    said core layer, semiconductor layer, dielectric layer and second semiconductor layer forming said omnidirectional reflector.

11. The multilayer stack of claim 10, wherein said second semiconductor layer has a thickness between 5-400 nm.

12. The multilayer stack of claim 11, wherein said second semiconductor layer is made from a semiconductor material selected from the group consisting of Si, amorphous Si, Ge or other semiconductor layer that has electronic bandgap in the visible range of the electromagnetic wave and combinations thereof.

13. The multilayer stack of claim 10, further comprising a partial absorber layer extending between said semiconductor layer and said dielectric layer.

14. The multilayer stack of claim 13, wherein said partial absorber layer has a thickness between 2-30 nm.

15. The multilayer stack of claim 14, wherein said partial absorber layer is made from a partial absorber material selected from the group consisting of Cr, Cu, Au, Sn and alloys thereof.

16. The multilayer stack of claim 12, further comprising a second dielectric layer in addition to said previous mentioned dielectric layer, said second dielectric layer extending across said second semiconductor layer and oppositely disposed said dielectric layer about said second semiconductor layer;

said core layer, semiconductor layer, dielectric layer, second semiconductor layer and second dielectric layer forming said omnidirectional reflector.

17. The multilayer stack of claim 16, wherein said second dielectric layer has a thickness between 0.1 QW-4.0 QW.

18. The multilayer stack of claim 17, wherein said second dielectric layer is made from a dielectric material having a refractive index greater than 1.6 and selected from the group consisting of ZnS, $TiO_2$, $Si_2N_4$, $HfO_2$, $Nb_2O_5$, $Ta_2O_5$ and combinations thereof.

19. The multilayer stack of claim 17, wherein said second dielectric layer is a colorful dielectric layer made from a colorful dielectric material selected from the group consisting of $Fe_2O_3$, $Cu_2O$ and combinations thereof.

20. The multilayer stack of claim 16, further comprising a partial absorber layer extending between said semiconductor layer and said dielectric layer.

21. The multilayer stack of claim 20, wherein said partial absorber layer has a thickness between 2-30 nm.

22. The multilayer stack of claim 21, wherein said partial absorber layer is made from a partial absorber material selected from the group consisting of Cr, Cu, Au, Sn and alloys thereof.

23. The multilayer stack of claim 1, wherein said core layer is selected from the group consisting of a reflector core layer, an absorber/reflector layer and a dielectric layer.

24. The multilayer stack of claim 23, wherein said core layer is said reflector core layer and has a thickness between 50-200 nm.

25. The multilayer stack of claim 24, wherein said reflector core layer is made from a reflector material selected from the group consisting of Al, Ag, Pt and alloys thereof.

26. The multilayer stack of claim 23, wherein said core layer is said absorber/reflector layer and has a thickness between has a thickness between 50-200 nm.

27. The multilayer stack of claim 26, wherein said absorber/reflector core layer is made from an absorber/reflector material selected from the group consisting of Cr, Cu, Au, Sn and alloys thereof.

28. The multilayer stack of claim 23, wherein said core layer is said dielectric core layer and has a thickness between has a thickness between 50-200 nm.

29. The multilayer stack of claim 28, wherein said dielectric core layer is made from a dielectric material selected from the group consisting of glass and mica.

30. The multilayer stack of claim 28, wherein said dielectric core layer is made from a colorful dielectric material selected from the group consisting of $Fe_2O_3$, $Cu_2O$ and combinations thereof.

* * * * *